(12) United States Patent
Eisler et al.

(10) Patent No.: US 8,290,849 B2
(45) Date of Patent: *Oct. 16, 2012

(54) METHOD AND SYSTEM FOR ADMINISTERING THE HEDGING OF AN EMPLOYEE DEFERRED COMPENSATION PLAN USING SWAPS

(75) Inventors: Clifford R. Eisler, Woodbury, NY (US); David J. Marshall, Milan, NY (US)

(73) Assignee: Analect Benefit Finance, LLC, Great Neck, NY (US)

( * ) Notice: Subject to any disclaimer, the term of this patent is extended or adjusted under 35 U.S.C. 154(b) by 1191 days.

This patent is subject to a terminal disclaimer.

(21) Appl. No.: 10/752,213

(22) Filed: Jan. 6, 2004

(65) Prior Publication Data

US 2005/0131798 A1   Jun. 16, 2005

Related U.S. Application Data

(63) Continuation-in-part of application No. 10/136,868, filed on Apr. 30, 2002, now abandoned, and a continuation of application No. 10/408,769, filed on Apr. 7, 2003, now abandoned.

(51) Int. Cl.
*G06Q 40/00*   (2012.01)
(52) U.S. Cl. ........................... 705/37; 705/36 R
(58) Field of Classification Search .............. 705/35–38, 705/36 R
See application file for complete search history.

(56) References Cited

U.S. PATENT DOCUMENTS

| | | | |
|---|---|---|---|
| 5,903,879 A | 5/1999 | Mitchell | |
| 5,918,218 A | 6/1999 | Harris et al. | |
| 5,991,744 A | 11/1999 | DiCresce | |
| 5,999,917 A | 12/1999 | Facciani et al. | |
| 6,021,397 A * | 2/2000 | Jones et al. | 705/36 R |
| 6,161,096 A | 12/2000 | Bell | |
| 6,205,434 B1 | 3/2001 | Ryan et al. | |

(Continued)

FOREIGN PATENT DOCUMENTS

WO    WO 97/43893    11/1997

(Continued)

OTHER PUBLICATIONS

American Bankers,401(k) Providers Seek an Edge in Slicing Transition 'Blackouts' Matt Ackermann. American Banker. New York, N.Y.: Apr. 30, 2002. vol. 167, Iss. 82; p. 7.*

(Continued)

*Primary Examiner* — Hani M Kazimi
*Assistant Examiner* — Clement B Graham
(74) *Attorney, Agent, or Firm* — Barry J. Schindler; Greenberg Traurig, LLP

(57) ABSTRACT

A method and system for administering the hedging of an employee deferred compensation plan, e.g., which employs hedging of NQDC plan liabilities using total return swaps and/or put and call options and/or forwards, for tax purposes. A plan coordinator coordinates a transfer of information between an employer/plan sponsor, a plan administrator that communicates with the employees/plan participants, and a balance sheet provider. The plan coordinator receives and reconciles data and then calculates and modifies relevant information for tax purposes and use in reports that are provided to the plan sponsor and balance sheet provider. Calculations and modifications for tax purposes allow the plan sponsor to reap tax benefits from the NQDC plan swap hedge. The reports include an upcoming transactions report, which indicates new compensation deferrals, reallocations of previously deferred compensation among specified indices, and withdrawals.

9 Claims, 19 Drawing Sheets

U.S. PATENT DOCUMENTS

| | | | |
|---|---|---|---|
| 6,766,303 B2* | 7/2004 | Marshall | 705/36 R |
| 7,089,202 B1* | 8/2006 | McNamar et al. | 705/36 R |
| 7,225,153 B2 | 5/2007 | Lange | |
| 7,249,037 B2 | 7/2007 | Koppes et al. | |
| 7,389,262 B1 | 6/2008 | Lange | |
| 2001/0014873 A1 | 8/2001 | Henderson et al. | |
| 2001/0027437 A1 | 10/2001 | Turbeville et al. | |
| 2001/0042785 A1* | 11/2001 | Walker et al. | 235/379 |
| 2001/0056398 A1 | 12/2001 | Scheirer | |
| 2002/0013751 A1 | 1/2002 | Facciani et al. | |
| 2002/0052816 A1* | 5/2002 | Clenaghan et al. | 705/36 |
| 2002/0099640 A1 | 7/2002 | Lange | |
| 2002/0103852 A1 | 8/2002 | Pushka | |
| 2002/0120542 A1 | 8/2002 | Higgins | |
| 2002/0143673 A1 | 10/2002 | Hitchings et al. | |
| 2002/0174023 A1 | 11/2002 | Grey et al. | |
| 2002/0174044 A1* | 11/2002 | Marshall | 705/36 |
| 2003/0041019 A1 | 2/2003 | Vagim et al. | |
| 2003/0093354 A1 | 5/2003 | Marshall | |
| 2003/0115128 A1* | 6/2003 | Lange et al. | 705/37 |
| 2003/0182147 A1* | 9/2003 | Mahoney et al. | 705/1 |
| 2004/0117288 A1 | 6/2004 | Marshall | |
| 2004/0117302 A1* | 6/2004 | Weichert et al. | 705/40 |
| 2004/0210503 A1 | 10/2004 | Marshall | |
| 2010/0153302 A1 | 6/2010 | Marshall | |

FOREIGN PATENT DOCUMENTS

| | | |
|---|---|---|
| WO | WO 03/098516 | 11/2003 |

OTHER PUBLICATIONS

U.S. Appl. No. 10/408,769.
U.S. Appl. No. 10/136,868.
U.S. Appl. No. 10/921,731.
Saunders Anthony, Credit Risk Measurement, May 1999, John Wiley and Sons, Inc. First Edition, pp. 186-204.
Interpretive Letter # 878, Jan. 2000 (Comptroller of the Currency, Adminstrator of National Banks).
Shultz, Paul T. Hall, Russel E., "New Developments in Nonqualified Deferred Compensation", Spring 1994, Employees Relations Law Journal. vol. 19, Iss. 4, p. 611.
Finnerty, John D "The PriceWaterhouseCoopers Credit derivatives Primer: Total Return swaps" Financier V7n1-4 pp. 66-77 2000.

* cited by examiner

| Date | Specified Indices | Unit Price | Participant #1 (Section 4.1) | | | | Participant #2 (Section 4.2) | | | | Participant #3 (Section 4.3) | | | | Totals (Section 4.4) | | | |
|---|---|---|---|---|---|---|---|---|---|---|---|---|---|---|---|---|---|---|
| | | | Tax Basis | Units | MV | Ownership | Tax Basis | Units | MV | Ownership | Tax Basis | Units | MV | Ownership | Tax Basis | Units | MV | Ownership |
| 01/31/02 | Janus Worldwide | 30.00 | 4500.00 | 150.00 | 4500.00 | 30.00% | 6900.00 | 230.00 | 6900.00 | 46.00% | 3600.00 | 120.00 | 3600.00 | 24.00% | 15000.00 | 500.00 | 15000.00 | 100.00% |
| | S&P | 10.00 | 4000.00 | 400.00 | 4000.00 | 40.00% | 2500.00 | 250.00 | 2500.00 | 25.00% | 3500.00 | 350.00 | 3500.00 | 35.00% | 10000.00 | 1000.00 | 10000.00 | 100.00% |
| 02/28/02 | Janus Worldwide | 28.00 | 4500.00 | 150.00 | 4200.00 | 30.00% | 6900.00 | 230.00 | 6440.00 | 46.00% | 3600.00 | 120.00 | 3360.00 | 24.00% | 15000.00 | 500.00 | 14000.00 | 100.00% |
| | S&P | 11.00 | 4000.00 | 400.00 | 4400.00 | 40.00% | 2500.00 | 250.00 | 2750.00 | 25.00% | 3500.00 | 350.00 | 3850.00 | 35.00% | 10000.00 | 1000.00 | 11000.00 | 100.00% |
| 03/31/02 | Janus Worldwide | 29.50 | 5125.00 | 175.00 | 5162.50 | 26.52% | 9275.00 | 325.00 | 9587.50 | 49.24% | 4600.00 | 160.00 | 4720.00 | 24.24% | 19000.00 | 660.00 | 19470.00 | 100.00% |
| | S&P | 11.80 | 3375.00 | 337.50 | 3982.50 | 56.25% | 125.00 | 12.50 | 147.50 | 2.08% | 2500.00 | 250.00 | 2950.00 | 41.67% | 6000.00 | 600.00 | 7080.00 | 100.00% |
| 04/30/02 | Janus Worldwide | 29.05 | 5125.00 | 175.00 | 5083.75 | 26.52% | 9275.00 | 325.00 | 9441.25 | 49.24% | 4600.00 | 160.00 | 4648.00 | 24.24% | 19000.00 | 660.00 | 19173.00 | 100.00% |
| | S&P | 11.80 | 3375.00 | 337.50 | 3982.50 | 56.25% | 125.00 | 12.50 | 147.50 | 2.08% | 2500.00 | 250.00 | 2950.00 | 41.67% | 6000.00 | 600.00 | 7080.00 | 100.00% |
| 05/31/02 | Janus Worldwide | 29.50 | 5125.00 | 175.00 | 5162.50 | 26.52% | 9275.00 | 325.00 | 9587.50 | 49.24% | 4600.00 | 160.00 | 4720.00 | 24.24% | 19000.00 | 660.00 | 19470.00 | 100.00% |
| | S&P | 14.00 | 1375.00 | 137.50 | 1925.00 | 34.38% | 125.00 | 12.50 | 175.00 | 3.13% | 2500.00 | 250.00 | 3500.00 | 62.50% | 4000.00 | 400.00 | 5600.00 | 100.00% |
| 06/30/02 | Janus Worldwide | 30.00 | 2806.82 | 95.00 | 2850.00 | 20.65% | 3281.92 | 115.00 | 3450.00 | 25.00% | 7361.11 | 250.00 | 7500.00 | 54.35% | 13449.85 | 460.00 | 13800.00 | 100.00% |
| | S&P | 14.50 | 6693.18 | 509.91 | 7393.74 | 35.55% | 6118.08 | 446.98 | 6481.23 | 31.16% | 5738.89 | 477.59 | 6924.99 | 33.29% | 18550.15 | 1434.48 | 20799.96 | 100.00% |
| 07/31/02 | Janus Worldwide | 30.34 | 2806.82 | 95.00 | 2882.30 | 20.65% | 3281.92 | 115.00 | 3489.10 | 25.00% | 7361.11 | 250.00 | 7585.00 | 54.35% | 13449.85 | 460.00 | 13956.40 | 100.00% |
| | S&P | 16.00 | 6693.18 | 509.91 | 8158.60 | 35.55% | 6118.08 | 446.98 | 7151.71 | 31.16% | 5738.89 | 477.59 | 7641.37 | 33.29% | 18550.15 | 1434.48 | 22951.68 | 100.00% |
| 08/31/02 | Janus Worldwide | 35.30 | 2806.82 | 95.00 | 3353.50 | 20.65% | 3281.92 | 115.00 | 4059.50 | 25.00% | 7361.11 | 250.00 | 8825.00 | 54.35% | 13449.85 | 460.00 | 16238.00 | 100.00% |
| | S&P | 16.40 | 6693.18 | 509.91 | 8362.57 | 35.55% | 6118.08 | 446.98 | 7330.50 | 31.16% | 5738.89 | 477.59 | 7832.40 | 33.29% | 18550.15 | 1434.48 | 23525.47 | 100.00% |
| 09/30/02 | Janus Worldwide | 34.75 | 6281.82 | 195.00 | 6776.25 | 29.80% | 3281.92 | 115.00 | 3996.25 | 17.57% | 9764.38 | 344.39 | 11967.55 | 52.63% | 19328.12 | 654.39 | 22740.05 | 100.00% |
| | S&P | 16.40 | 6693.18 | 509.91 | 8362.57 | 35.55% | 4106.28 | 300.00 | 4920.00 | 27.59% | 3335.62 | 277.59 | 4552.48 | 25.53% | 14135.08 | 1087.50 | 17835.05 | 100.00% |
| 10/31/02 | Janus Worldwide | 35.62 | 6281.82 | 195.00 | 6945.90 | 29.80% | 3281.92 | 115.00 | 4096.30 | 17.57% | 9764.38 | 344.39 | 12267.17 | 52.63% | 19328.12 | 654.39 | 23309.37 | 100.00% |
| | S&P | 16.56 | 6693.18 | 509.91 | 8444.16 | 46.89% | 4106.28 | 300.00 | 4968.00 | 27.59% | 3335.62 | 277.59 | 4596.89 | 25.53% | 14135.08 | 1087.50 | 18009.05 | 100.00% |
| 11/30/02 | Janus Worldwide | 35.72 | 6281.82 | 195.00 | 6965.40 | 35.61% | 4308.49 | 148.13 | 5291.30 | 27.06% | 5795.00 | 204.39 | 7300.81 | 37.33% | 16385.31 | 547.52 | 19557.51 | 100.00% |
| | S&P | 15.78 | 6693.18 | 509.91 | 8046.42 | 38.36% | 3079.71 | 225.00 | 3550.50 | 16.92% | 7305.00 | 594.50 | 9381.17 | 44.72% | 17077.89 | 1329.41 | 20978.09 | 100.00% |
| 12/31/02 | Janus Worldwide | 34.86 | 6281.82 | 195.00 | 6797.70 | 35.61% | 4308.49 | 148.13 | 5163.91 | 27.06% | 5795.00 | 204.39 | 7125.04 | 37.33% | 16385.31 | 547.52 | 19086.64 | 100.00% |
| | S&P | 15.43 | 6693.18 | 509.91 | 7867.95 | 38.36% | 3079.71 | 225.00 | 3471.75 | 16.92% | 7305.00 | 594.50 | 8173.10 | 44.72% | 17077.89 | 1329.41 | 20512.80 | 100.00% |

Deferred Compensation Plan Details

Date Range: 03/01/2002 03/31/2002

Sponsor: Sponsor X

Participant: Participant #2

| Effective Date | Event | Weighted Unit Price | Tax Basis Amount (dollars) | Market Valuation Amount (dollars) | Allocated or Reallocated to | Reallocated or Withdrawal From |
|---|---|---|---|---|---|---|
| 03/31/2002 | Reallocation | $10.00 | 2,375.00 | 2,802.50 | Janus Worldwide | S&P |
| | | | $2,375.00 | $2,802.50 | | |

Employee Funds Current Summary

| Specified Indices | Units | Unit Price | Tax Basis (dollars) | Market Valuation (dollars) | Ownership % |
|---|---|---|---|---|---|
| Janus Worldwide | 325.00 | 29.50 | 9,275.00 | 9,587.50 | 46.00% |
| S&P | 12.50 | 11.80 | 125.00 | 147.50 | 25.00% |
| | | | $9,400.00 | $9,735.00 | |

FIG.6

Deferred Compensation Plan Summary
Date of Report as of March 31, 2002 (Effective Date)

Balance Sheet Provider: Balance Sheet Provider A
Sponsor: Sponsor X

Mar-02 [Section 7.1]

| Specified Indices | Units | Tax Basis Weighted Unit Price | Tax Basis | Market Valuation Unit Price | Market Valuation |
|---|---|---|---|---|---|
| S&P | 600.00 | 10.00 | 6,000.00 | 11.80 | 7080.00 |
| Janus Worldwide | 650.00 | 28.79 | 19,000.00 | 29.50 | 19470.00 |
| Total | | | $25,000.00 | | $26,550.00 |

Feb-02 [Section 7.2]

| Specified Indices | Units | Tax Basis Weighted Unit Price | Tax Basis | Market Valuation Unit Price | Market Valuation |
|---|---|---|---|---|---|
| S&P | 1000.00 | 10.00 | 10000.00 | 11.00 | 11000.00 |
| Janus Worldwide | 500.00 | 30.00 | 15000.00 | 28.00 | 14000.00 |
| Total | | | $25,000.00 | | $25,000.00 |

Monthly Change [Section 7.3]

| Specified Indices | Units | Tax Basis Weighted Unit Price | Tax Basis | Market Valuation Unit Price | Market Valuation |
|---|---|---|---|---|---|
| S&P | (400.00) | 0.00 | (4000.00) | 0.80 | (3920.00) |
| Janus Worldwide | 160.00 | (1.21) | 4000.00 | 1.50 | 5470.00 |
| Total | | | $0.00 | | $1,550.00 |

FIG.7

NQDC Plan Swap Hedge Re-Weighting Report
Date of Report as of March 28, 2002

Balance Sheet Provider: Balance Sheet Provider A
Sponsor: Sponsor X

03/31/2002 DC Plan
[Section 8.1]

| Specified Indices: | Units | Market Unit Price | Market Valuation | Hedging Benchmark: |
|---|---|---|---|---|
| S&P | 600.00 | $11.80 | $7,080.00 | S&P |
| Janus Worldwide | 660.00 | $29.50 | $19,470.00 | Janus Worldwide |
| Total | | | $26,550.00 | |

Actual 02/28/2002 NQDC Plan Swap Hedge
[Section 8.2]

| Units | Weighted Unit Price | Capitalized Cost | Unit Price | Market Valuation |
|---|---|---|---|---|
| 1000.00 | $10.00 | $10,000.00 | $11.00 | $11,000.00 |
| 500.00 | $30.00 | $15,000.00 | $28.00 | $14,000.00 |
| | | $25,000.00 | | $25,000.00 |

Monthly Re-Weighting Request
[Section 8.3]

| Units | Unit Price | Market Valuation |
|---|---|---|
| (400.00) | $0.80 | ($3,920.00) |
| 160.00 | $1.50 | $5,470.00 |
| | | $1,550.00 |

FIG.8

Swap Summary
Date of Report as of March 31, 2002 [Effective Date]

Balance Sheet Provider: Balance Sheet Provider A
Sponsor: Sponsor X

[Section 9.1]

| Hedging Benchmarks | Capitalized Cost | | | Market Valuation | | |
|---|---|---|---|---|---|---|
| | Units | Unit Price | Capitalized Cost | | Unit Price | Market Valuation |
| S&P | 600.00 | 10.00 | 6000.00 | | 11.80 | 7080.00 |
| Janus Worldwide | 660.00 | 29.88 | 19720.00 | | 29.50 | 19470.00 |
| Implicit Cash | | | (720.00) | | | |
| Total | | | $25,000.00 | | | $26,550.00 |

[Section 9.2]

Balance Sheet Provider Pays/(Receives)

| Hedging Benchmarks | Index Reset Frequency | Next Index Settlement Date | Next Index Reset Date | Cumulative Index Settlement | LIBOR Reset Frequency | Cumulative Index Settlement | Next LIBOR Settlement Date | Next LIBOR Reset Date | LIBOR Rate | Spread | Next LIBOR Settlement Amount | Cumulative LIBOR Payments |
|---|---|---|---|---|---|---|---|---|---|---|---|---|
| S&P | 3 months | 04/30/02 | 05/01/02 | 0.00 | 30 days | 0.00 | 04/30/02 | 05/01/02 | 2.00% | 1.00% | 13.80 | 49.66 |
| Janus Worldwide | 3 months | 04/30/02 | 05/01/02 | 0.00 | 30 days | 0.00 | 04/30/02 | 05/01/02 | 2.00% | 1.00% | 49.30 | 73.75 |
| Implicit Cash | | | | 0.00 | 30 days | 0.00 | 04/30/02 | 05/01/02 | 2.00% | 0.00% | 0.00 | 0.00 |
| Total | | | | $0.00 | | $0.00 | | | | | $63.10 | $123.41 |

[Section 9.3]

| Hedging Benchmarks | Current Capitalized Cost | Current Market Valuation | Cumulative Swap Income/(Expense) | Current Swap Income/(Expense) | YTD Swap Income/(Expense) | Cumulative Swap Income/(Expense) |
|---|---|---|---|---|---|---|
| S&P | 6000.00 | 7080.00 | 750.00 | 330.00 | 1080.00 | 1080.00 |
| Janus Worldwide | 19720.00 | 19470.00 | (1000.00) | 750.00 | (250.00) | (250.00) |
| Implicit Cash | (720.00) | 0.00 | 0.00 | 720.00 | 720.00 | 720.00 |
| Total | $25,000.00 | $26,550.00 | ($250.00) | $1,800.00 | $1,550.00 | $1,550.00 |

FIG.9

Swap Details
Date of Report as of March 31, 2002 [Effective Date]

Balance Sheet Provider: Balance Sheet Provider A
Sponsor: Sponsor X
Swap #: 113-46-1831
Swap Start Date: 01/31/2002

Plan Sponsor: Plan Sponsor X
Accrual Basis: Actual/360

| Hedging Benchmarks | Units | Capitalized Cost Unit Price | Capitalized Cost | Market Valuation Unit Price | Market Valuation | Balance Sheet Provider Pays/(Receives) Index Settlement | Cumulative Index Settlement | LIBOR Rate | Plan Sponsor Pays Spread | LIBOR Settlement Amount | Cumulative LIBOR Payments |
|---|---|---|---|---|---|---|---|---|---|---|---|
| S&P | 12.50 | 10.00 | 125.00 | 11.80 | 147.50 | 0.00 | 0.00 | 2.00% | 1.00% | 0.28 | 12.41 |
| Janus Worldwide | 325.00 | 29.88 | 9,710.61 | 29.50 | 9587.50 | 0.00 | 0.00 | 2.00% | 1.00% | 24.28 | 33.93 |
| Implicit Cash | | | (15.00) | | 0.00 | 0.00 | 0.00 | 2.00% | 0.00% | 0.00 | 0.00 |
| Total | | | $9,820.61 | | $9,735.00 | | $0.00 | | | $24.55 | $46.34 |

| Hedging Benchmarks | Cumulative Index Settlement | Current Capitalized Cost | Current Market Valuation | Cumulative Swap Income/(Expense) | Current Swap Income/(Expense) | YTD Swap Income/(Expense) | Cumulative Swap Income/(Expense) |
|---|---|---|---|---|---|---|---|
| S&P | 0.00 | 125.00 | 147.50 | 187.50 | (165.00) | 22.50 | 22.50 |
| Janus Worldwide | 0.00 | 9710.61 | 9587.50 | (460.00) | 336.89 | (123.11) | (123.11) |
| Implicit Cash | 0.00 | (15.00) | 0.00 | 0.00 | 15.00 | 15.00 | 15.00 |
| Total | $0.00 | $9,820.61 | $9,735.00 | ($272.50) | $186.89 | ($85.61) | ($85.61) |

FIG.10

Deferred Compensation Plan Exposure/Swap Position Summary
Date of Report as of March 31, 2002 [Effective Date]

Balance Sheet Provider: Balance Sheet Provider A
Sponsor: Sponsor X

SWAP POSITION [Section 11.1]

| Hedging Benchmarks | Units | Capitalized Cost — Unit Price | Capitalized Cost | Market Valuation — Unit Price | Market Valuation | Specified Indices |
|---|---|---|---|---|---|---|
| S&P | 600.00 | 10.00 | 6000.00 | 11.80 | 7080.00 | S&P |
| Janus Worldwide | 660.00 | 29.88 | 19720.00 | 29.50 | 19470.00 | Janus Worldwide |
| Implicit Cash | | | (720.00) | | | |
| Total | | | $25,000.00 | | $26,550.00 | |

NET INCOME/(EXPENSE) [Section 11.4]

Swap Income/(Expense)

| | |
|---|---|
| Market Valuation | 26550.00 |
| Capitalized Cost | 25000.00 |
| Cumulative Index Settlements | 0.00 |
| Prior Period Cumulative Swap (Income)/Expense | (250.00) |
| Monthly Swap Income/(Expense) | $1,800.00 |
| YTD Swap Income/(Expense) | $1,550.00 |
| Cumulative Swap Income/(Expense) | $1,550.00 |

DEFERRED COMPENSATION PLAN EXPOSURE [Section 11.2]

| | Units | Tax Basis — Weighted Unit Price | Tax Basis | Market Valuation — Unit Price | Market Valuation — Current Market Valuation |
|---|---|---|---|---|---|
| | 600.00 | 10.00 | 6000.00 | 11.80 | 7080.00 |
| | 660.00 | 28.79 | 19000.00 | 29.50 | 19470.00 |
| | | | $25,000.00 | | $26,550.00 |

Deferred Compensation Plan Income/(Expense)

| | |
|---|---|
| Market Valuation | 26550.00 |
| Prior Period Market Valuation | (25236.05) |
| New Deferrals | (4720.00) |
| New Withdrawals | 4720.00 |
| Monthly DC Plan Income/(Expense) | ($1,313.95) |
| YTD DC Plan Income/(Expense) | ($1,550.00) |
| Cumulative DC Plan Income/(Expense) | ($1,550.00) |

NET EXPOSURE [Section 11.3]

| | in Units | in Value |
|---|---|---|
| | 0.00 | 0.00 |
| | 0.00 | 0.00 |
| | $0.00 | $0.00 |

Net Income/(Expense)

| | |
|---|---|
| Monthly Income/(Expense) | $486.05 |
| YTD Income/(Expense) | $275.00 |
| Cumulative Income/(Expense) | $0.00 |

FIG.11

Accounting Report
Date of Report as of March 31, 2002

Balance Sheet Provider: Balance Sheet Provider A
Sponsor: Sponsor X

Deferred Compensation Plan

| Specified Indices | 03/31/2002 Market Valuation | 02/28/2002 Market Valuation | New Deferrals | New Withdrawals | DC Plan (Income)/ Expense |
|---|---|---|---|---|---|
| S&P | 7080.00 | 11000.00 | 0.00 | 4720.00 | 800.00 |
| Janus Worldwide | 19470.00 | 14000.00 | 4720.00 | 0.00 | 750.00 |
| Company Stock | 0.00 | 0.00 | 0.00 | 0.00 | 0.00 |
| Total | $26,550.00 | $25,000.00 | $4,720.00 | $4,720.00 | $1,550.00 |

Swap Income/(Expense)

| Hedging Benchmarks | Cumulative Index Settlement | 03/31/2002 Capitalized Cost | 03/31/2002 Market Valuation | 02/28/2002 Cumulative Swap Income/ (Expense) | Current Swap Income/ (Expense) | LIBOR Settlement Amount |
|---|---|---|---|---|---|---|
| S&P | 0.00 | 6000.00 | 7080.00 | 750.00 | 330.00 | (26.99) |
| Janus Worldwide | 0.00 | 19720.00 | 19470.00 | (1000.00) | 750.00 | (37.75) |
| Implicit Cash | 0.00 | (720.00) | 0.00 | 0.00 | 720.00 | 0.00 |
| Company Stock | 0.00 | 0.00 | 0.00 | 0.00 | 0.00 | 0.00 |
| Total | $0.00 | $25,000.00 | $26,550.00 | ($250.00) | $1,800.00 | ($64.84) |

Accounting Entries:

Change in Deferred Compensation Valuations

| | | | |
|---|---|---|---|
| Deferred Comp Expense | | A $1,550.00 | |
|     Deferred Comp Plan Obligation | | | $1,550.00 |
| Deferred Tax Asset | | $620.00 | |
|     Income Tax Expense | | | $620.00 B |

Swap Valuation on Receivable Leg

| | | | |
|---|---|---|---|
| Receivable on DC Hedge | | $1,800.00 | |
|     Deferred Comp Expense | A | | $1,800.00 |
| Income Tax Expense | B | $720.00 | |
|     Deferred Tax Asset | | | $720.00 |

Swap LIBOR Interest on Payable Leg

| | | | |
|---|---|---|---|
| Deferred Comp Expense | A | $64.84 | |
|     Payable on DC Hedge | | | $64.84 |
| Deferred Tax Asset | | $25.94 | |
|     Income Tax Expense | | | $25.94 B |

Swap LIBOR Settlement

| | | |
|---|---|---|
| Payable on DC Hedge | $64.84 | |
|     Cash | | $64.84 |

P&L Summary

| | Income Summary | Pre-tax Equivalent |
|---|---|---|
| Deferred Comp Income/(Expense) | Σ of A $185.16 | |
| Income Tax Expense | Σ of B ($74.06) | |
| Net Income/(Expense) | $111.10 | $185.16 |

FIG.12

Termination Event Details
Date of Report as of September 30, 2002 [Effective Date]
(Due to Partial Withdrawal)

Balance Sheet Provider: Balance Sheet Provider A
Plan Participant: Participant #2
Swap #: 113-46-1531
Swap Start Date: 1/31/2002
Sponsor: Sponsor X

| Hedging Benchmarks | Capitalized Cost | Units | Weighted Redemption Unit Price | Units | Market Unit Price | Capitalized Cost Redeemed | Market Valuation Redeemed | Termination Payment |
|---|---|---|---|---|---|---|---|---|
| S&P | 7151.71 | 446.98 | 16.00 | 146.98 | 16.40 | 2351.71 | 2410.50 | 58.78 |
| Total | | | | | | $2,351.71 | $2,410.50 | $58.78 |

FIG.13

Tax Report
Date of Report as of September 30, 2002

Balance Sheet Provider: Balance Sheet Provider A
Sponsor: Sponsor X
Swap Start Date: 1/31/2002

| Hedging Benchmarks: | Market Valuation Redeemed | Market Valuation at Time of Withdrawal | Cumulative Swap Income/ (Expense) |
|---|---|---|---|
| S&P | $2,410.50 | $7,330.47 | $958.55 |
| Total | $2,410.50 | $7,330.47 | $958.55 |

| Hedging Benchmarks: | Cumulative Gain/(Loss) on Swap | Cash Settlement on Options/Forwards |
|---|---|---|
| S&P | $315.20 | $0.00 |
| Total | $315.20 | $0.00 |

| Hedging Benchmarks: | Cumulative LIBOR Accruals | Tax Deductible LIBOR Accruals |
|---|---|---|
| S&P | $64.80 | $21.31 |
| Total | $64.80 | $21.31 |

Summary for this Distribution:

| | TAX | GAAP | Original Deferral | Cumulative |
|---|---|---|---|---|
| Taxable Income: | | | | |
| Gains on Swaps | $315.20 | $315.20 | | |
| Gains on Options/Forwards | $0.00 | $0.00 | | |
| Tax Deduction: | | | | |
| Deferred Compensation Expense | ($2,410.50) | ($2,410.50) | $2,011.80 | |
| Proportionate LIBOR Payments | ($21.31) | ($21.31) | | |
| Net Tax Deduction upon Withdrawal | ($2,116.61) | ($2,116.61) | $2,011.80 | ($104.81) |

FIG.14

Transaction Log Details - Non-Company Stock
Date of Report: 06/27/2008
(in dollars)

Balance Sheet Provider: Balance Sheet Provider A
Sponsor: Sponsor X

| Employee # | Event | Instruction Date | Effective Date of Transaction | Original Deferral Amount | Current Valuation Amount | Allocated or Reallocated to | Reallocated or Withdrawn from |
|---|---|---|---|---|---|---|---|
| 076-46-3675 | Reallocation | 6/15/08 | 6/30/08 | $25,000 | $28,500 | S&P 500 | Lehman Agg |
| 090-50-3446 | Reallocation | 6/22/08 | 6/30/08 | $50,000 | $60,000 | Balanced | Lehman Agg |
| 091-98-7441 | Withdrawal | 5/31/02 | 6/30/08 | $10,000 | $23,000 | | S&P 500 |
| 091-98-7441 | Withdrawal | 5/31/02 | 6/30/08 | $10,000 | $16,000 | | Lehman Agg |
| 091-98-7441 | Withdrawal | 5/31/02 | 6/30/08 | $8,000 | $21,000 | | Balanced |
| 056-46-4604 | Reallocation | 6/18/08 | 6/30/08 | $22,500 | $25,000 | Lehman Agg | Money Market |
| 021-78-7981 | Reallocation | 6/21/08 | 6/30/08 | $30,000 | $42,000 | Money Market | S&P 500 |
| 057-79-7981 | Reallocation | 6/21/08 | 6/30/08 | $15,000 | $18,000 | S&P 500 | Money Market |
| 076-46-3675 | New Deferral | 5/31/08 | 7/1/08 | $10,000 | $10,000 | Balanced | |
| 090-50-3446 | New Deferral | 5/31/08 | 7/1/08 | $23,000 | $23,000 | Balanced | |
| 084-32-4687 | Withdrawal | 6/15/06 | 7/1/08 | $10,000 | $32,000 | | Lehman Agg |
| 096-80-4640 | New Deferral | 5/31/08 | 7/1/08 | $18,000 | $18,000 | Lehman Agg | |
| 032-46-4671 | Withdrawal | 6/29/05 | 7/5/08 | $15,000 | $46,000 | | S&P 500 |
| 092-32-1328 | Withdrawal | 6/28/05 | 7/10/08 | $20,000 | $45,250 | | S&P 500 |

Summary by Date:

| | | | | | |
|---|---|---|---|---|---|
| 6/30/08 | | Money Market | -$7,500 | -$1,000 | |
| | | Lehman Agg | -$62,500 | -$79,500 | |
| | | S&P 500 | $0,000 | -$18,500 | |
| | | Balanced | $42,000 | $39,000 | |
| | | | -$28,000 | -$60,000 | |
| 7/1/08 | | Money Market | | | |
| | | Lehman Agg | $8,000 | -$14,000 | |
| | | S&P 500 | $33,000 | $33,000 | |
| | | Balanced | $41,000 | $19,000 | |
| 7/5/08 | | Money Market | | | |
| | | Lehman Agg | | | |
| | | S&P 500 | -$15,000 | -$46,000 | |
| | | Balanced | -$15,000 | -$46,000 | |

FIG. 15A

```
              Money Market
              Lehman Agg
                 S&P 500         -$20.000        -$45.250
                 Balanced
                                 -$20.000        -$45.250
```

Totals available by Plan Sponsor (Counterparty) and by Swap Provider
Transaction schedule available in advance, run every day to show next [two] weeks' activity
Separate transaction schedule will be provided for Company Stock transactions

FIG. 15B

NQDC Plan Swap Hedge Spread Details
Date of Report: January 31, 2002

Plan Sponsor X

|  | PLAN COORDINATOR 1 | | | BALANCE SHEET PROVIDER A | | NQDC PLAN SWAP HEDGE TOTALS | | |
| --- | --- | --- | --- | --- | --- | --- | --- | --- |
| Hedging Benchmarks | Capitalized Cost | Spread | Amount | Spread | Amount | LIBOR Rate | Spread | Monthly LIBOR Payments |
| S&P | $10,000.00 | 0.35% | $2.72 | 2.15% | $16.72 | 2.00% | 0.50% | $19.44 |
| Janus Worldwide | $15,000.00 | 0.50% | $5.83 | 2.25% | $26.25 | 2.00% | 0.75% | $32.08 |
| Implicit Cash | $0.00 | 0.00% | $0.00 | 2.00% | $0.00 | 2.00% | 0.00% | $0.00 |
| Total | $25,000.00 | | $8.56 | | $42.97 | | | $51.53 |

Plan Sponsor Y

|  | PLAN COORDINATOR 1 | | | BALANCE SHEET PROVIDER A | | NQDC PLAN SWAP HEDGE TOTALS | | |
| --- | --- | --- | --- | --- | --- | --- | --- | --- |
| Hedging Benchmarks | Capitalized Cost | Spread | Amount | Spread | Amount | LIBOR Rate | Spread | Monthly LIBOR Payments |
| Goldman Sachs Cored Fixed Income | $210,260.00 | 0.50% | $81.77 | 2.25% | $367.96 | 2.00% | 0.75% | $449.72 |
| Goldman Sachs Mortgage Backed Securities | $103,670.00 | 0.50% | $40.32 | 2.25% | $181.42 | 2.00% | 0.75% | $221.74 |
| Implicit Cash | ($6,295.00) | 0.00% | $0.00 | 2.00% | ($9.79) | 2.00% | 0.00% | ($9.79) |
| Total | $307,635.00 | | $122.08 | | $539.59 | | | $661.67 |

| Grand Total for Balance Sheet Provider A | $332,635.00 | $130.64 | $582.56 | $713.20 |
| --- | --- | --- | --- | --- |

FIG.16

Implicit Cash Calculations
Date of Report as of March 31, 2002

Balance Sheet Provider: Balance Sheet Provider A  
Sponsor: Sponsor X

Report Run Date: 04/02/2002 04:50 PM

| Hedging Benchmarks | Units Reallocated Out | Prior Weighted Unit Price | Capitalized Cost of Reallocation | Current Market Unit Price | Market Valuation of Reallocation | Change in Implicit Cash | Prior Implicit Cash | Calculated Implicit Cash* | Current Implicit Cash |
|---|---|---|---|---|---|---|---|---|---|
| S&P | 400.00 | $10.00 | $4,000.00 | $11.80 | $4,720.00 | ($720.00) | $0.00 | ($720.00) | ($720.00) |
| Totals | | | $4,000.00 | | $4,720.00 | ($720.00) | $0.00 | ($720.00) | ($720.00) |

* Before Index Settlement is made if this is an Index Settlement Month

FIG.17

Dividends Report
Date of Report as of March 31, 2002

<u>Balance Sheet Provider:</u> Balance Sheet Provider A
<u>Sponsor:</u> Sponsor X

| Specified Indices | Units | Dividend Price /Share | Dividend Amount |
|---|---|---|---|
| S&P | 600.00 | $0.50 | $300.00 |
| Janus | 660.00 | $0.30 | $198.00 |
| Totals | | | $498.00 |

METHOD AND SYSTEM FOR ADMINISTERING THE HEDGING OF AN EMPLOYEE DEFERRED COMPENSATION PLAN USING SWAPS

CROSS REFERENCE TO RELATED APPLICATIONS

This application is a continuation-in-part of U.S. patent application Ser. No. 10/136,868, filed Apr. 30, 2002, now abandoned, and a continuation of U.S. patent application Ser. No. 10/408,769, filed Apr. 7, 2003, now abandoned, the disclosures of both of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to administering, e.g., for asset/liability management and/or tax purposes, the hedging of certain obligations of an employer or plan sponsor in an employee deferred compensation plan using total return swaps and/or options and/or forwards. In the United States, the invention relates to administering the hedging of such obligations in a nonqualified (under the United States Internal Revenue Code) deferred employee compensation (or NQDC) plan.

The invention has particular application to NQDC plans in the United States. Therefore, the description below is directed to application of the invention to NQDC plans with the understanding that the invention may have application to other plans both in the United States and in other jurisdictions which may or may not involve tax consequences triggered by a withdrawal by, or a distribution or award to, a plan participant under the plan. Implementation of the invention in such other applications will be evident to persons of skill in the relevant art(s) in the United States and in other countries.

NQDC plans have become increasingly popular since they allow employers to provide tax-deferred compensation to select employees. In fact, an estimated 85% of the Fortune 1000 companies use such plans to compensate their executives. Smaller companies as well have realized the benefit of such plans. Under a NQDC plan, the income tax on the compensation is not immediately realized by the employee when it is awarded, and such compensation is not taxed to the employee until it is actually withdrawn, which may be several years after it is awarded. Although the compensation is not tax deductible to the employer until it is received by the employee, the employer avoids the need to immediately allocate funds to compensate the employee, and the employee gains no property right in the deferred compensation on any earnings related to the deferred compensation until they are received by the employee.

An NQDC plan must not be formally funded to avoid a constructive receipt of the compensation by the employee, and NQDC plan obligations appear as expenses on the employer's income statement, creating an open liability on its balance sheet until the benefits are paid. The eventual withdrawal of the benefits results in a cash outflow from the employer. As these cash outflows can prove untimely if left unhedged, the employer may choose to hedge its NQDC plan obligation, typically by purchasing taxable investments or corporate-owned life insurance. The adequacy of such hedges vary in regard to their relative tax ramifications and or economic ramifications as compared to the obligation(s).

Total return swaps, options, and forwards have been used by companies to hedge their balance sheet. However, the use of swaps, options, and forwards to hedge NQDC plan employer obligations in particular has been limited. Formerly, they would have been an alternative to taxable investments and did not provide any significant benefit to the employer over any other taxable investments. Recently, however, the use of taxable investments as a hedge for tax purposes has been eliminated under the Internal Revenue Code (IRC). Treasury regulation section 1.1221-2(d)(5) states that, unless published guidance or a private letter ruling from the Internal Revenue Service determines otherwise:

[T]he purchase or sale of a debt instrument, an equity security, or an annuity contract is not a hedging transaction even if the transaction limits or reduces the taxpayer's risk with respect to ordinary property, belongings, or ordinary obligations.

This regulation leaves swaps, options, and forwards as attractive alternatives for tax-conscientious companies with outstanding NQDC plan liabilities to hedge.

Published Patent Application No. US 2002/0174044 A1 discloses a concept for hedging the liabilities of a deferred compensation plan using total return swaps and/or options and/or forwards. As disclosed in that application, a plan sponsor, e.g., an employer, enters into an agreement with a swap counterparty under which the plan sponsor hedges its liability under an NQDC plan in return for payments to the swap counterparty. For options and forwards, the agreement would be between the plan sponsor and an option dealer and a forward dealer, respectively. The swap counterparty, the option dealer and the forward dealer are generically and collectively referred to herein as a "balance sheet provider," which is typically an independent third party. Employees who are selected and participate in the plan are referred to herein as plan participants. The concept described in this published patent application involves retention by a plan sponsor typically of a plan administrator, such as a financial services organization, to handle the administration of the plan, or the plan administrator may be part of the plan sponsor.

In the agreement between the balance sheet provider and the plan sponsor mentioned above, referred to herein as a "hedge agreement" or "hedge instrument," the balance sheet provider agrees to pay the plan sponsor an amount based on a notional investment realized via swaps and/or options and/or forwards, in one or more hedging benchmarks, such as a money market fund, a fixed income fund, an equity fund, a balanced fund, an S&P 500 stock fund, and so forth. In return, the plan sponsor pays the balance sheet provider a fee, which may be based on an interest rate benchmark plus a spread. The plan sponsor uses the proceeds from the swap and/or options and/or forwards to hedge its obligation to the plan participants and to partially fund the obligation when participants withdraw amounts from their plans.

The plan sponsor can potentially benefit from the concept described above in the following ways:

(a) Balance Sheet Usage: The plan sponsor frees up funds it would have otherwise used to buy a cash asset (e.g., taxable investments or corporate owned life insurance) and may make these funds available to reinvest in its business.

(b) Taxes: The plan sponsor benefits from the swap and/or options and/or forwards hedging structure because the swap gains are not taxed until the sponsor pays a participant's withdrawal request from the plan. Fees paid to the balance sheet provider by the plan sponsor are tax-deductible, generally at the time of the withdrawal payment.

(c) Liquidity Match: The plan sponsor receives payments from the balance sheet provider at the time when the sponsor is obligated to pay plan participants payments for withdrawals or earlier, thereby providing a liquidity match between the plan sponsor's liability cash flow out with a cash flow in from the hedge.

(d) Lower Cost: The plan sponsor pays the balance sheet provider a fee based on an interest rate benchmark and a spread. The fee is only a small percentage of the total liability being hedged for the plan sponsor and generally is less than the cost of Corporate Owned Life Insurance (COLI), currently a popular hedge instrument for NQDC plans.

(e) Minimal Tracking Error: The hedge provided by the balance sheet provider may be based on the same notional investments used in the plan. That is, when the plan sponsor owes an amount based on a notional investment in fund A, the hedge can be designed so that the balance sheet provider owes an amount to the plan sponsor based upon a notional investment in the same fund, matching the plan sponsor's plan obligation perfectly with the hedge.

SUMMARY OF THE INVENTION

For an NQDC plan to be implemented in which an employer's or plan sponsor's liability is hedged using swaps and/or options and/or forwards, and/or for a plan sponsor or employer to realize the potential tax benefits in such a plan, the inventors recognized that an arrangement would have to be devised to administer such a plan, that administration of such a plan involved complexities, such as those summarized below, and that these complexities were different from those involved in the administration of other financial arrangements. Published Patent Application No. US 2002/0174044 A1, discussed above, does not disclose how to administer an NQDC plan embodying the concept disclosed in the Application to, among other things, realize potential tax benefits available to the plan sponsor and minimize the plan sponsor's net exposure under the plan.

An NQDC plan may have many participants—some plans have thousands of participants. Each plan participant has the opportunity to make new deferrals, reallocations, and withdrawals periodically (such as monthly). These deferrals, reallocations and withdrawals, and other events (referred to herein as plan participant events), may number in the thousands per plan since plan participants may have the right to request certain or all of the events as often as they would like, in some cases. Each plan participant event may possibly affect the hedge, as it may change the amount of liabilities the plan sponsor holds.

An NQDC plan swap hedge may be performed for each participant based on the plan participant's deferred compensation plan elections, but this is highly inefficient and costly, because as mentioned previously, there can be thousands of participants in each plan. As a result, it is preferable that the NQDC plan swap hedge of a NQDC plan for tax purposes be executed for the entire plan taken as a whole at an aggregate level.

A withdrawal by an NQDC plan participant triggers a taxable event, at which time the hedge amounts attributable to that particular withdrawal become reportable as taxable gains or losses. Hedge amounts attributable to the withdrawal include gains/losses earned on the hedge and hedge-related payments.

Hedging of employer obligations in NQDC plans that may cover many different participants whose allocation of deferred compensation over various specified indices (funds in which plan participants can allocate) can periodically change due to new deferrals, reallocations and withdrawals. Currently, balance sheet providers do not have the capacity to perform a NQDC plan swap hedge to address the deferred compensation liabilities that arise from each new plan participant event.

Complexities arising in the administration of an NQDC plan of the type described above involve data at plan participant level and data at a hedge agreement or aggregate level. Published Patent Application No. US 2002/0174044 A1 also does not address complexities relating to plan participant level data and aggregate level data in its disclosure of a concept for hedging an NQDC plan.

The invention enables and facilitates implementation of a hedge for at least that portion of a deferred compensation plan in which a plan sponsor hedges its liability under the plan for notional investments of deferred compensation awards, made to plan participants, using at least one hedge instrument that comprises one or more of a total return swap, an option and a forward contract provided by a balance sheet provider, by providing for the administration of the hedge. Among other things, the invention provides for the data modification, reports, methods, systems and computer programs disclosed herein, which various embodiments of the invention use individually and in combinations to provide such administration.

The methodology provided by the invention for administering the hedging of a plan sponsor's NQDC plan obligations using swaps and/or options and/or forwards, e.g., for tax purposes, is unique compared to methodology used in other administrative systems.

The data modification provided by the invention translates or converts between data at a plan participant level and data at a hedge agreement or aggregate level. Translating or converting data from a plan participant level to a hedge agreement level can be referred to as "aggregation," and converting data from a hedge agreement level to a plan participant level can be referred to as "disaggregation."

The invention provides for dividing or apportioning, i.e., disaggregating, hedge results among plan participants and their deferred elections in a reasonable and consistent manner in order to meet IRC standards, as if mini-NQDC plan swap hedges had been performed for each participant.

The invention addresses both the needs of the balance sheet provider and the plan sponsor in performing data modification that simplifies transactions and accommodates tax and financial reporting. Specifically, an aspect of data modification in accordance with the invention involves providing the deferred compensation plan data in aggregated form to the balance sheet provider. Data modification provided for by the invention, e.g., to aggregate plan participant event details, makes carrying out the NQDC plan swap hedge a feasible and attractive business for the balance sheet provider.

Additionally, the invention enables disaggregation of the NQDC plan swap hedge data for each NQDC plan swap transaction to the plan participant level. The invention provides for disaggregation of the NQDC plan swap hedge to meet tax code standards, which allows the plan sponsor to realize tax benefits from the NQDC plan swap hedge.

The invention provides for NQDC plan swap hedge-related tax calculations and reporting for the plan sponsor. One of the benefits of the NQDC plan swap arrangement is the deferral of taxes related to the hedge until withdrawals from the deferred compensation plan are made. One drawback to the tax deferral is the extensive record-keeping required over the period the employee participates in the NQDC plan. In addition, taxation is specific to each individual participant's withdrawal. The cumulative NQDC plan swap hedge gains and losses, along with the corresponding cumulative payments to the balance sheet provider, disaggregation thereof and allocation per participant provided for by the invention facilitate correct computation of taxes. The invention provides for all the necessary record-keeping and data modification to efficiently calculate the amounts that are now taxable or tax-deductible.

The invention provides for NQDC plan swap hedge data per event, from which any tax benefit from using the hedge may be computed and realized. Deferring tax payment on NQDC plan swap hedge gains until the deferred compensation obligation being hedged is paid to the employee is currently recognized as the principal tax benefit. The invention provides for reasonably calculating, tracking and maintaining NQDC plan swap hedge information per individual plan participant over the life of their participation in the deferred compensation plan. As pointed out above, a withdrawal by a plan participant under an NQDC plan triggers a tax event, and the invention provides for detailed information addressing the tax event, such as the portion of the cumulative NQDC plan swap hedge gain/loss and the corresponding interest fee payments made by the plan sponsor related to the portion being withdrawn by the participant. The invention provides methods for calculating these amounts cognizant of tax code standards of reasonableness and consistency, and addresses these standards by using a defined and repeatable methodology to calculate these terms on a participant level.

A method according to one embodiment of the invention comprises accumulating information relating to the at least one hedge instrument on an aggregate level and information relating to at least the hedged portion of the plan on an aggregate level and on a plan participant level, disaggregating aggregate information relating to the at least one hedge instrument into respective portions attributable to each plan participant, and calculating taxable and tax-deductible amounts of the plan sponsor related to a tax triggering event of a plan participant in consideration of (a) a respective portion of the at least one hedge instrument attributable to that plan participant and (b) accumulated information.

The aggregate level information to be accumulated relating to the at least one hedge instrument may be provided by or on behalf of a balance sheet provider. The plan participant level and aggregate level information relating to the deferred compensation plan to be accumulated may be provided by or on behalf of the plan sponsor. As discussed above, the invention provides for data modification between plan participant level information and aggregate level information.

Accumulating information on an aggregate level may comprise accumulating information on at least one of return earned or lost on the hedge instrument by the plan sponsor, return on the hedge instrument paid to or paid by the plan sponsor, the notional investment in the hedge instrument made by the plan sponsor and payments made to the balance sheet provider pursuant to the at least one hedge instrument.

Current information on the aggregate level may include information on at least one of return earned or lost on the hedge instrument by the plan sponsor, return on the hedge instrument paid to or paid by the plan sponsor, the notional investment in the hedge instrument made by the plan sponsor and payments made to the balance sheet provider pursuant to the at least one hedge instrument.

Data modification in accordance with the invention also involves translation of deferred compensation plan liabilities into a NQDC plan swap hedge re-weighting request on an aggregate level. The invention provides for a re-weighting request for plan participant events such as deferrals, reallocations and withdrawals to reset the current NQDC plan swap hedge to match the recent changes in the deferred compensation liabilities. A re-weighting request may also involve converting the deferred compensation plan liabilities into corresponding NQDC plan swap hedging benchmark values on an aggregate level, when hedging benchmarks that do not match the deferred compensation plan specified indices (henceforth referred to as "proxies") are utilized. For example, a plan sponsor may offer four or five mutual funds as NQDC plan indices. Further, the sponsor may agree that for all but one of these specified indices, the same mutual fund will be used as the swap hedging benchmark. The final mutual fund will be hedged using a proxy. For instance the S&P 500 index may be used as a proxy to hedge a NASDAQ 100 index offered by the plan sponsor in its plan.

The invention also enables a plan sponsor to match up all of its obligations under the deferred compensation plan with its NQDC plan swap hedges and assess its net risk, often referred to as "tracking error" or "exposure." Tracking error results from a variety of reasons, such as timing differences between the period when the deferred compensation liabilities are recorded and when the NQDC plan swap hedge is executed. Therefore, there can often be a difference between the value of the deferred compensation liabilities and the NQDC plan swap hedges. The plan sponsor is exposed to this difference and, therefore, should be aware of the tracking error on an ongoing basis to minimize its exposure. Also, the tracking error is informative to the plan sponsor as it serves as an indication of the degree to which the NQDC plan swap hedging is effective. The invention provides for tracking and monitoring each plan participant event and its effect on the corresponding NQDC plan swap hedge, when applicable, and also provides for monitoring of the tracking error on an aggregate basis. Information relating to exposure resulting from tracking error may, in accordance with the invention, be provided in periodic reports to the plan sponsor, enabling the plan sponsor to effectively monitor its risk.

A method according to another embodiment of the invention determines a plan sponsor's net exposure under the plan that uses at least one hedge instrument comprising one or more of a total return swap, an option and a forward contract provided by a balance sheet provider. In accordance with this method, current information is received, e.g., from the balance sheet provider, relating to the at least one hedge instrument on an aggregate level, and current information on at least the hedged part of the plan is received, e.g., from the plan sponsor, on a plan participant and aggregate level. The plan sponsor's net exposure is determined under the plan from a current liability of the plan sponsor under the plan based on the aggregate level information, and a current position for the at least one hedge instrument based on the aggregate level information.

In a method according to another embodiment of the invention, one or more changes in the at least one hedge instrument are determined that would better hedge the plan sponsor's liability under the plan in consideration of changes in the plan based on information relating to the at least one hedge instrument on an aggregate level and information relating to at least the hedged portion of the plan on an aggregate level, and at least one request is provided for a balance sheet provider to change the at least one hedge instrument in accordance with the determined change or changes. The plan sponsor's liability under at least the hedged portion of the plan is determined from the aggregate level information described above.

The invention facilitates the coordination and sharing of information between the plan sponsor, a plan administrator, and the balance sheet provider(s). In addition, this coordination maintains regular communication between these different parties to optimize the NQDC plan swap hedge process since effective execution of the hedge is affected by the timing and the accuracy of deferred compensation plan information.

The invention also provides for record-keeping, such as a plan sponsor's net position, profit and loss, and tax consequences, and for providing information via reports in a variety of different formats distributed by different media in, e.g., hard-copy and electronic form. Since a plan participant's involvement in an NQDC plan may extend for years and decades, part of such record-keeping is for long term purposes to track and calculate on a consistent and reasonable basis such hedge amounts, which can optimize the tax benefits of an NQDC plan.

The invention provides for swap, option, forward, and deferred compensation information to be presented in both aggregated and disaggregated form in regularly distributed reports, e.g. monthly. Pertinent reports may be provided to a plan administrator and the balance sheet provider(s), in addition to the plan sponsor.

Methods provided by the invention include providing various reports. In one embodiment, profit and loss of the plan sponsor is calculated for the deferred compensation plan, the at least one hedge instrument, and net profit and loss, and a report is created that includes one or more of the following: a deferred compensation plan/swap position summary report describing the plan sponsor's net exposure; a summary of accounting entries and profit and loss of the plan sponsor relating to its deferred compensation plan and the at least one hedge instrument; and a summary of tax impact, cumulative profit and loss, and cumulative hedging results relating to the portion of the at least one hedge instrument corresponding to any withdrawal of deferred compensation by a plan participant.

In other embodiments, methods may provide the following reports: at least one report containing accumulated information (and hence historical information) relating to the at least one hedge instrument and to any withdrawal of deferred compensation by a plan participant; at least one report containing a basis for the one or more changes that have been determined to better hedge the plan sponsor's liability under the plan; and at least one report containing a basis for the plan sponsor's liability under at least the hedged portion of the plan.

The invention provides for calculating NQDC plan swap hedge-related accounting entries and summarizing the entries on a regular basis. An accounting report, e.g., provided for this purpose, preferably is a profit and loss statement. The accounting entries serve to support the plan sponsor's ability to keep accurate financial reports while the accounting report reflects how the NQDC plan swap hedge is affecting the plan sponsor's income statement.

In a preferred embodiment, the invention provides for a plan coordinator to provide for record keeping, data modification, reports, etc., in the administration of an NQDC plan of the type described herein. A plan administrator, which may be an outside financial services organization retained by the plan sponsor, may be provided to provide for communication between the plan sponsor and plan participants. ("Plan sponsor" is used herein in a broad sense, and may encompass a plan administrator, unless the context indicates otherwise. For example, information provided or received by a plan sponsor may encompass a plan administrator providing or receiving such information.)

The invention provides for one or more and preferably all of the following, preferably provided by a plan coordinator: (1) coordinating communication between the plan sponsor, a plan administrator, and the balance sheet provider(s), (2) aggregating and disaggregating data to make the hedging transactions efficient and maintain adequate records for tax hedging purposes, (3) tracking and reporting differences between the deferred compensation plan liabilities and NQDC plan swap hedges, (4) calculating accounting entries, (5) calculating and reporting tax events, (6) providing long-term tax-related record-keeping, and (7) supporting process modifications which better fulfill individual plan sponsors' objectives.

In the preferred embodiment, the plan coordinator performs one or more of the following: accumulating of the information, e.g., as historical information, and calculating of the taxable and tax-deductible amounts from the received balance sheet provider-related information and the received plan sponsor-related information; determining of the one or more changes from the received balance sheet provider-related information and the received plan sponsor-related information, and to provide the at least one request for the balance sheet provider to change the at least one hedge instrument in accordance with the determined change or changes; and determining the plan sponsor's net exposure under at least the hedged portion of the plan from the received balance sheet provider-related information and the received plan sponsor-related information.

Inventive methods may include combinations and subcombinations of the methods described above.

The invention also provides computer programs embodied on a computer-readable medium or media for storing participant level plan information and aggregate level information and carrying out the methods described above on a computer system.

In addition, the invention provides a computer system for administering the hedging of at least that portion of a deferred compensation plan in which a plan sponsor has hedged its liability under the plan for notional investments of deferred compensation awards, made to plan participants, using at least one hedge instrument that comprises one or more of a total return swap, an option and a forward contract provided by a balance sheet provider. Such a system comprises at least one storage device that receives and stores, under control of at least one computer, accumulated information relating to the at least one hedge instrument on an aggregate level and accumulated information relating to at least the hedged portion of the plan on an aggregate level and on a plan participant level, including information relating to tax triggering events of plan participants; and the at least one computer and/or one or more other computers coupled to the at least one storage device and programmed to perform the functionality described herein.

Methodology, methods and systems provided by the invention may support different plan administrators, balance sheet providers, investment types, schedules, tracking error sensitivity, hedging objectives, data formats, and data types. Plan administrators and balance sheet providers can vary in a number of areas such as technological capabilities, staffing, schedules, reporting methods, which need to be accommodated in order to make the swap and/or option and/or forward an effective hedge for the plan sponsor. Methodology and systems provided by the invention may also accommodate a variety of process modifications including but not limited to calculating required data on behalf of the balance sheet provider(s) or plan administrator, requesting NQDC plan swap hedges either by units or currency amounts, initiating NQDC plan swap processes with various timings and/or frequencies, accommodating the differences among various investment choices including settlement rules and timing, converting foreign currencies, supporting the use of proxies to hedge NQDC plan liabilities, supporting the use of various data formats and types.

BRIEF DESCRIPTION OF THE DRAWINGS

FIG. 4 is a spreadsheet summarizing plan participant balances in a deferred compensation plan consisting of three participants, over the course of twelve months, in accordance with the invention.

FIG. 5 is a spreadsheet summarizing swap positions for a hedge of the three-participant, deferred compensation plan summarized in FIG. 4.

FIG. 6 depicts a sample Deferred Compensation Plan Details report for one participant in accordance with an embodiment of the invention.

FIG. 7 depicts a sample Deferred Compensation Plan Summary Report in accordance with an embodiment of the invention.

FIG. 8 depicts a sample NQDC Plan Swap Hedge Re-Weighting report in accordance with an embodiment of the present invention.

FIG. 9 depicts a sample Swap Summary report in accordance with an embodiment of the invention.

FIG. 10 depicts a sample Swap Details report for one plan participant in accordance with an embodiment of the invention.

FIG. 11 depicts a sample Deferred Compensation Plan Exposure/Swap Position Summary report in accordance with an embodiment of the invention.

FIG. 12 depicts a sample Accounting Report in accordance with an embodiment of the invention.

FIG. 13 depicts a sample Termination Event Details report in accordance with an embodiment of the invention.

FIG. 14 depicts a sample Tax Report in accordance with an embodiment of the invention.

FIG. 15, consisting of FIGS. 15A and 15B, depicts a sample Transaction Log Details—Non-Company Stock report in accordance with an embodiment of the invention.

FIG. 16 depicts a sample NQDC Plan Swap Hedge Spread Details report in accordance with an embodiment of the invention.

FIG. 17 depicts a sample Implicit Cash Calculations report in accordance with an embodiment of the invention.

FIG. 18 depicts a sample Dividends Report in accordance with an embodiment of the invention.

DETAILED DESCRIPTION OF PREFERRED EMBODIMENTS

The NQDC Plan Hedge Concept

Figure 1:
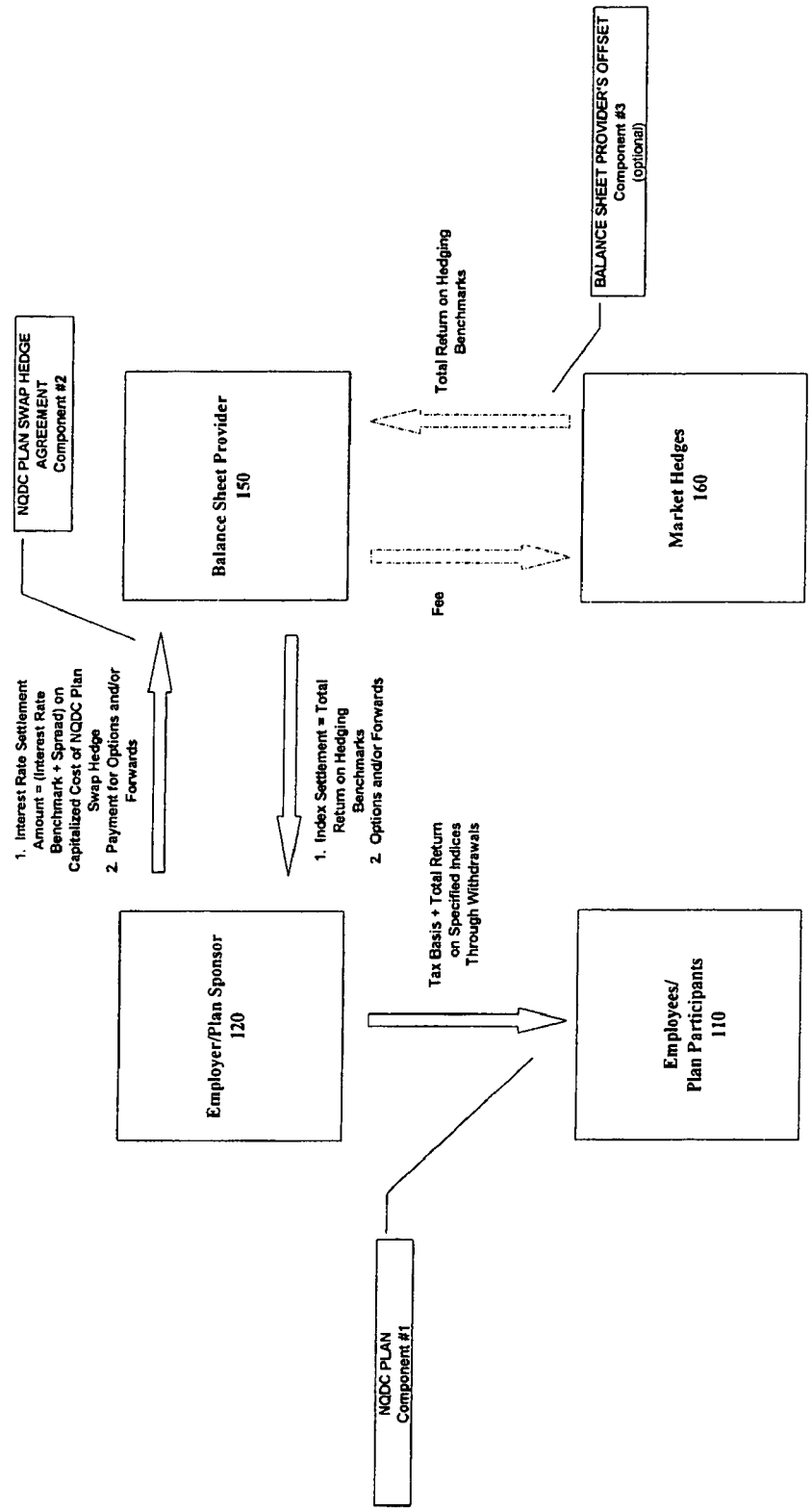
FIG. 1 is a diagram of components and process flow for the hedging of an employee deferred compensation plan using swaps and/or options and/or forwards.

Referring to FIG. 1, a concept for hedging an employee deferred compensation plan for tax purposes using one or more of total return swaps, options and forwards includes three components. Component #1 is the NQDC Plan provided by the plan sponsor 120, typically an employer, for participants 110 in the plan (plan participants), typically employees of the plan sponsor. Component #2 is an NQDC Plan Swap Hedge Agreement (or instrument) entered into by the plan sponsor 120 and the balance sheet provider 150, by which the plan sponsor hedges at least a portion of its obligations under the NQDC Plan (Component #1). Component #3 is the balance sheet provider 150's hedge or offset, which is an optional component. The three components are discussed below in more detail. When the balance sheet provider 150 enters into the NQDC Plan Swap Hedge Agreement (or simply "Hedge Agreement" or "Hedge Instrument") with the plan sponsor 120, the balance sheet provider 150 adds a liability to its balance sheet. The balance sheet provider 150 may choose to address its liability by seeking market hedges 160, directly purchasing the assets on which its liability to the plan sponsor 120 is based, or leaving the liability unhedged. Whether and how the balance sheet provider 150 chooses to offset or hedge its obligation is not typically part of the Hedge Agreement between the plan sponsor and the balance sheet provider.

NQDC Plan Arrangement Component. Under the concept represented by FIG. 1, the plan sponsor 120 offers a NQDC Plan to select employees or plan participants 110. The plan allows plan participants 110 to defer compensation and notionally invest the deferred amount in specified indices. These indices can range from mutual funds to alternative investments such as private equity funds. The amount a plan participant 110 defers and notionally invests in the plan is referred to as the plan participant 110's Tax Basis. The plan sponsor 120 does not pay the plan participant 110 any part of the deferred amount up front, and only pays the plan participant when the plan participant withdraws all or part of the deferred amount from the NQDC Plan. At the time of a withdrawal, the plan sponsor 120 pays the plan participant 110 the Tax Basis of the withdrawn amount plus the total return on the withdrawn amount in the specified indices. (The plan participant may make numerous partial withdrawals, in which case only a portion of the deferred amount is withdrawn each time together with the return on the withdrawn portion.) As the Tax Basis is notionally invested, the plan sponsor 120 does not actually have to invest in the specified indices in which the participants 110 make allocations. The plan sponsor 120 is not required to hedge its liability in any way. However, without a hedge in place, the plan sponsor 120 risks having an increasing liability on its balance sheet for the returns on the notional investments of deferred amounts by plan participants.

For example, assume a plan with one plan participant 110 who makes an initial deferral of $100.00 to an S&P 500 specified index. The initial amount grows to $250.00 after ten years. The plan participant 110 withdraws the full amount after the ten-year period, at which point the plan sponsor 120 must pay the participant $250.00.

NQDC Plan Swap Hedge Component. Continuing with a discussion of the concept represented by FIG. 1, the plan sponsor 120 hedges its plan using swaps and/or options and/or forwards for tax purposes by entering into an agreement (e.g., the Hedge Agreement or Instrument) with a balance sheet provider 150 under which the balance sheet provider 150 agrees to pay the plan sponsor 120 a total return amount, referred to generally as an index settlement, based on a notional investment in one or more funds or indices referred to generally as hedging benchmarks. To hedge the plan sponsor 120's liability as accurately as possible, the hedging benchmarks should match the funds used as specified indices in the NQDC Plan. However, the plan sponsor 120 may choose to use proxies because of various hedging objectives or other motivations. In return for the swap portion of the NQDC plan swap hedge ("the swap hedge"), the plan sponsor 120 pays the balance sheet provider 150 a fee, referred to generally as an interest rate settlement amount, which may be based on an interest rate benchmark (e.g., London Interbank Offered Rate, or "LIBOR") plus a spread. The capitalized cost, or notional principal of the swap, may include an initial amount as well as subsequent additional contributions that may be made periodically. In addition, the balance sheet provider 150 may sell options and/or forwards to the plan sponsor 120. In return for options and/or forwards, the plan sponsor makes a payment to the balance sheet provider 150 per the current practice for these types of products. The plan sponsor 120 may enter into an agreement with multiple balance sheet providers 150 and vice versa.

For example, assume an initial capitalized cost of $100.00 is used for the NQDC Plan Swap Hedge, to match the deferral made by the participant as part of the NQDC Plan. The amount is allocated to an S&P 500 hedging benchmark for ten years. In this example, the hedging benchmark is the same as the specified index used for the NQDC Plan. Further, assume the initial amount (i.e., the capitalized cost) grows to $250.00 (the market valuation) at the end of the ten-year term. Then, at the end of the term, the balance sheet provider 150 pays the plan sponsor $250.00−$100.00=$150.00, the index settlement. This payment, along with the respective capitalized cost amounts, can be settled and reset at specified intervals. The plan sponsor 120 is liable to the plan participant 110 for $250.00, even though it has received only $150.00 from the balance sheet provider 150, and the plan sponsor 120 must obtain the additional $100.00, the original deferral amount, from its own resources. The plan sponsor 120 makes periodic payments, e.g., monthly, to the balance sheet provider 150 based on the current capitalized cost amount and the sum of the benchmark interest rate and the spread. For example, assuming the applied interest rate is 7% and the capitalized cost is $100.00, the plan sponsor 120 will make a monthly payment (usually calculated utilizing an actual/360 basis) of $100×0.07×30/360=$0.58. The payment will increase accordingly when a spread such as 1.0% is added to the benchmark interest rate.

Balance Sheet Provider's Offset Component. Continuing further with the discussion of the concept represented by FIG. 1, the balance sheet provider 150, by entering into the NQDC Plan Swap Hedge with the plan sponsor 120, in turn, adds a liability to its balance sheet. The balance sheet provider 150 essentially takes the plan sponsor 120's deferred compensation liability on to its own balance sheet by providing this hedge to the plan sponsor 120. In exchange for this use of its balance sheet, the balance sheet provider 150 receives the periodic interest rate settlement amount. This exchange is the origin of the term "balance sheet provider." However, the balance sheet provider 150 does not have the obligation to directly invest in the hedging benchmarks in the NQDC plan swap hedge. The balance sheet provider 150 is in a position similar to that of a plan sponsor 120 who has not yet decided how to hedge its deferred compensation liability. The balance sheet provider 150 may choose to address its liability by seeking market hedges 160, directly purchasing the assets on which its liability to the plan sponsor 120 is based, or leaving the liability unhedged. The balance sheet provider 150 is willing to enter into the agreement since it knows it can at least obtain funds at the benchmark interest rate and directly invest in the hedging benchmarks. The balance sheet provider 150 is then guaranteed a profit due to the spread. However, there may be more cost efficient ways for the balance sheet provider 150 to address its own liability, and the balance sheet provider 150 may choose a method along those lines. As mentioned previously, the method in which the balance sheet provider 150 chooses to offset its obligation is not part of a typical Hedge Agreement with the plan sponsor.

Overview of Plan Administration

Figure 2:
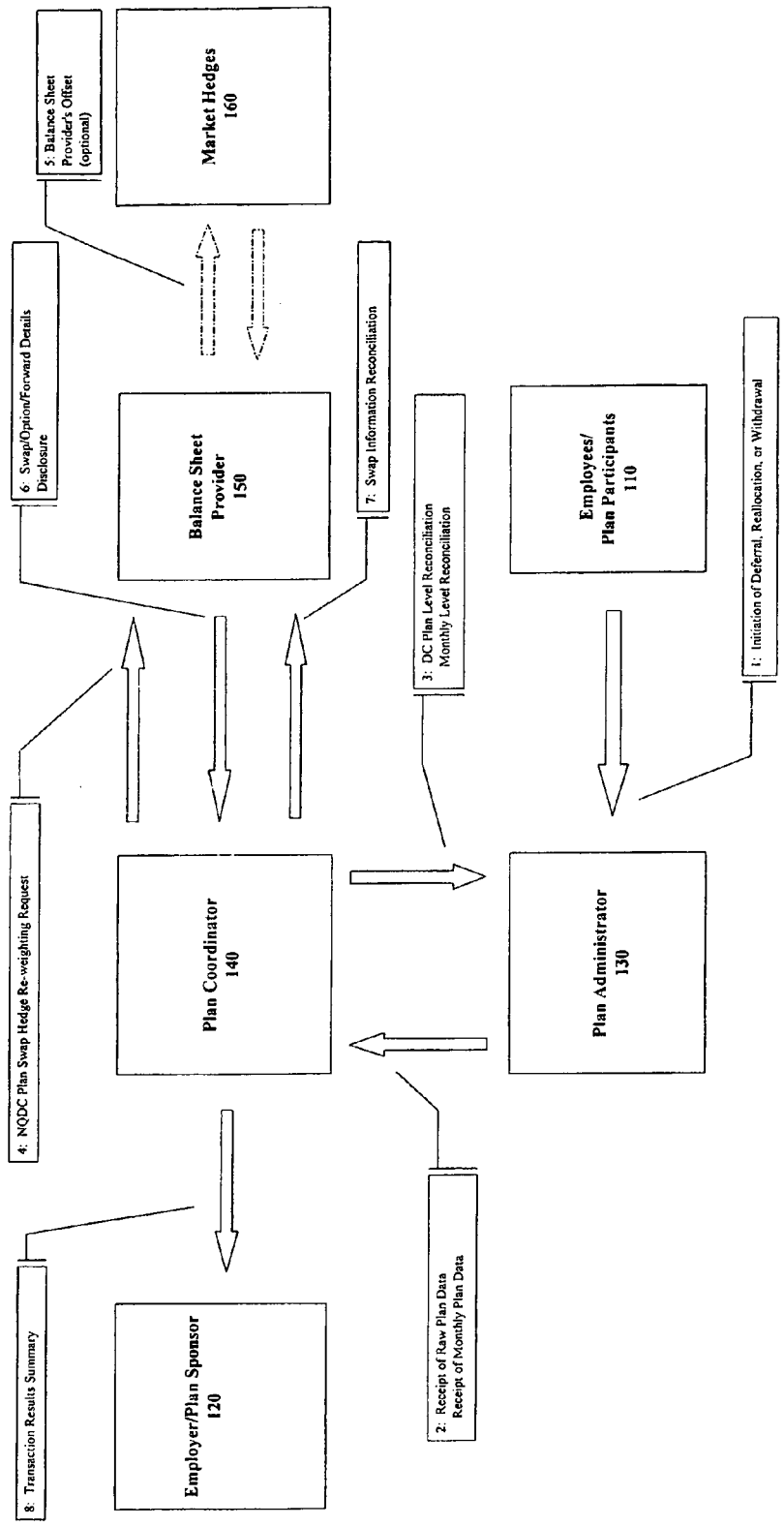
FIG. 2 is a diagram of a system and process flow for administering the hedging of an employee deferred compensation plan in accordance with an embodiment of the invention.

FIG. 2 illustrates an embodiment of process flow for administering the hedging of an employee deferred compensation plan for tax purposes in accordance with the invention. Process flow arrows are used to indicate process flow between the parties. The blocks themselves represent the parties and the methodologies performed by the respective parties, such as calculations, data modification, report preparation, etc., not represented by a process flow arrow.

The process flow represented in FIG. 2 assumes an in-place NQDC Plan between a plan sponsor 120 and plan participants 110, and a Hedge Agreement between the plan sponsor 120 and a balance sheet provider 150. The plan sponsor 120 typically retains a plan administrator 130, such as a financial services organization, to handle the administration of the plan, or the plan administrator 130 may be part of the plan sponsor 120. Reference to functions performed by a plan administrator is made herein with the understanding that such functions may be performed by the plan administrator alone, the plan sponsor alone, or both. The plan administrator 130 communicates with the plan participants 110 to inform them of details of their deferred compensation awards, such as amounts and dates on which the funds may be reallocated and withdrawn. The plan administrator 130 may also explain to the plan participants 110 various choices they may have regarding specified indices that may be selected for allocating their deferred compensation balances. These choices may be similar to those offered participants in a 401(k) plan. The deferred compensation is only invested notionally, but the participant 110 gains the benefit of an actual investment in the specified indices. The compensation may be allocated to one or more of the specified indices based on the participant 110's instructions. The compensation may be reallocated to different specified indices periodically, such as once every month, or once every three months.

Referring to FIG. 2, as represented by the process flow arrow designated 1, plan participants 110 provide plan participant level information such as new deferral, reallocation or withdrawal instructions to the plan administrator 130. Various conditions may further be applied regarding when existing balances can be reallocated, when new deferrals can be allocated (e.g., due to new deferred compensation awards), or when funds may be withdrawn. The plan administrator 130 may also impose an instruction deadline by which the plan participants 110 must provide their instructions, e.g., for new allocations, reallocations, and withdrawals. For example, a two-week lead-time may be enforced to provide time to implement the instructions. The plan administrator 130 may obtain valuations of the specified indices that are selected by the plan participants 110, e.g., from market data sources, such as a real-time stock/fund ticker or the like.

In a preferred embodiment, the invention provides a plan coordinator 140, which provides the functionality and reports disclosed herein. Referring to FIG. 2, as represented by the process flow arrow designated 2a, the plan coordinator 140 communicates with the plan administrator 130 to receive and accumulate information on a plan participant level and aggregate level, such as raw plan data, monthly plan data, outstanding participant balances and upcoming transactions of the plan participants 110. The plan coordinator 140 reconciles plan participant level information, and, as represented by the process flow arrow designated 3a, provides plan participant level reconciliation, e.g., monthly, to the plan administrator 130. Reconciliation may involve reviewing the information to ensure it is consistent with previous records. The plan coordinator 140 provides reports, for example, the sample reports depicted in FIGS. 6 and 7, which may be used for plan participant level and aggregate level reconciliation.

As represented by the process flow arrow designated 4 in FIG. 2, the plan coordinator 140 provides aggregate level information relating to the plan sponsor's liabilities under the plan, e.g., re-weighting requests (discussed below), to the balance sheet provider 150, which has entered into a NQDC Plan Swap Hedge Agreement with the plan sponsor 120. For example, the sample NQDC Plan Swap Re-Weighting Request report depicted in FIG. 8 may be used for this purpose. As mentioned, such hedging agreements allow the plan sponsor 120 to reduce the risks associated with its future liabilities in making payments of deferred compensation and the investment returns thereon to its plan participants 110. Upcoming transactions, such as new allocations of deferred compensation to specified indices, reallocations from one index to another, and withdrawals represent changes in risk to the plan sponsor 120. Accordingly, the plan sponsor 120 seeks to have its Hedge Agreement modified to reflect these changing exposures, and the balance sheet provider 150 uses an NQDC plan swap hedge re-weighting request (see, e.g., the report depicted in FIG. 8) provided to it by the plan coordinator 140 to adjust its positions in the hedging benchmarks and then updates the Hedge Agreement accordingly.

Still referring to FIG. 2, the balance sheet provider 150 itself may enter into further transactions or agreements with other parties in the hedges market 160 to offset its liabilities, as represented by the process flow arrow designated 5. After an NQDC Plan Swap Hedge is executed, the plan coordinator 140 receives aggregate level information relating to the swap, e.g., swap/option/forward details, from the balance sheet provider 150, as represented by the process flow arrow designated 6. In addition, the balance sheet provider 150 may provide current and cumulative index settlement information to the plan coordinator 140. The plan coordinator reconciles this aggregate level information, and may provide a report or reports to the balance sheet provider 150, as represented by the process flow arrow designated 7. For example, the plan coordinator 140 may confirm the capitalized cost amounts and current market valuations, e.g., via a market data source. The plan coordinator 140 may also confirm information relating to an interest rate benchmark used to determine the fees for the NQDC plan swap hedge, such as LIBOR, including reset dates, current rate, spread, accrual basis, and the interest rate settlement amount due the balance sheet provider 150 by the plan sponsor 120. The sample reports depicted in FIGS. 9 and 10, for example, may be used for reconciliation and other purposes.

With continued reference to FIG. 2, after the data from the balance sheet provider 150 is reconciled, the plan coordinator 140 performs data conversion(s), e.g., disaggregation, and calculations, and provides the plan sponsor 120 with reports detailing the transactions, swap hedge, option, and forward results, exposure, profit and loss, tax and accounting, as represented by the process flow arrow designated 8. (See, e.g., the reports depicted in FIGS. 4-15) These reports may also be used for reconciliation purposes by the plan sponsor 120. As discussed in more detail below, the plan coordinator 140 may provide to the plan administrator 130 and the balance sheet provider 150, as needed, this and other information in the form of reports, which may be the same or similar to selected ones of the sample reports depicted in FIGS. 4-18.

In addition to the information transferred between parties for purposes of executing the swap, option, and forward hedges, information is updated and reconciled on a regular basis, e.g. monthly, between the plan administrator 130 and the plan coordinator 140, as presented by the process arrows designated 2b and 3b in FIG. 2. The plan coordinator may provide reports such as those depicted in FIGS. 6, 7, and 11. Information and reports may pass multiple times among the plan sponsor 120, the plan administrator 130, the plan coordinator, the balance sheet provider 150 and the market hedge 160, as represented by process arrows 1-8 in FIG. 2, during administration of an NQDC plan, e.g., during a swap hedge re-weighting period, depending on the NQDC plan swap hedge structure and timing.

Thus, the invention provides for the plan sponsor 120 and balance sheet provider 150 to be informed of all transactions on a timely basis to enable the plan sponsor 120 to hedge its risks in the plan in an optimal manner.

The plan sponsor 120, the plan administrator 130, the plan coordinator 140 and the balance sheet 150 provider may communicate with each other in various ways, such as by electronic means such as a computer network, an intranet, the Internet, a telephone interface, or by mail. The plan administrator and plan participants may communicate by similar means.

Agreements may be in place in addition to the hedge agreement between the balance sheet provider 150 and plan sponsor 120 to ensure proper functioning of the NQDC plan swap hedge and its administration. Agreements may include trilateral or bilateral agreements between any of the parties described in FIG. 2. For instance, along with the hedge agreement between the balance sheet provider 150 and plan sponsor 120, the plan coordinator 140 may have agreements with those two parties to provide the administration of the NQDC plan swap hedge, along with an agreement with the plan administrator 130 to secure deferred compensation plan information necessary for the administration of the NQDC plan swap hedge. The agreements in place will depend on the specific NQDC plan swap hedge structure and the preferences of the parties involved.

Figure 3:
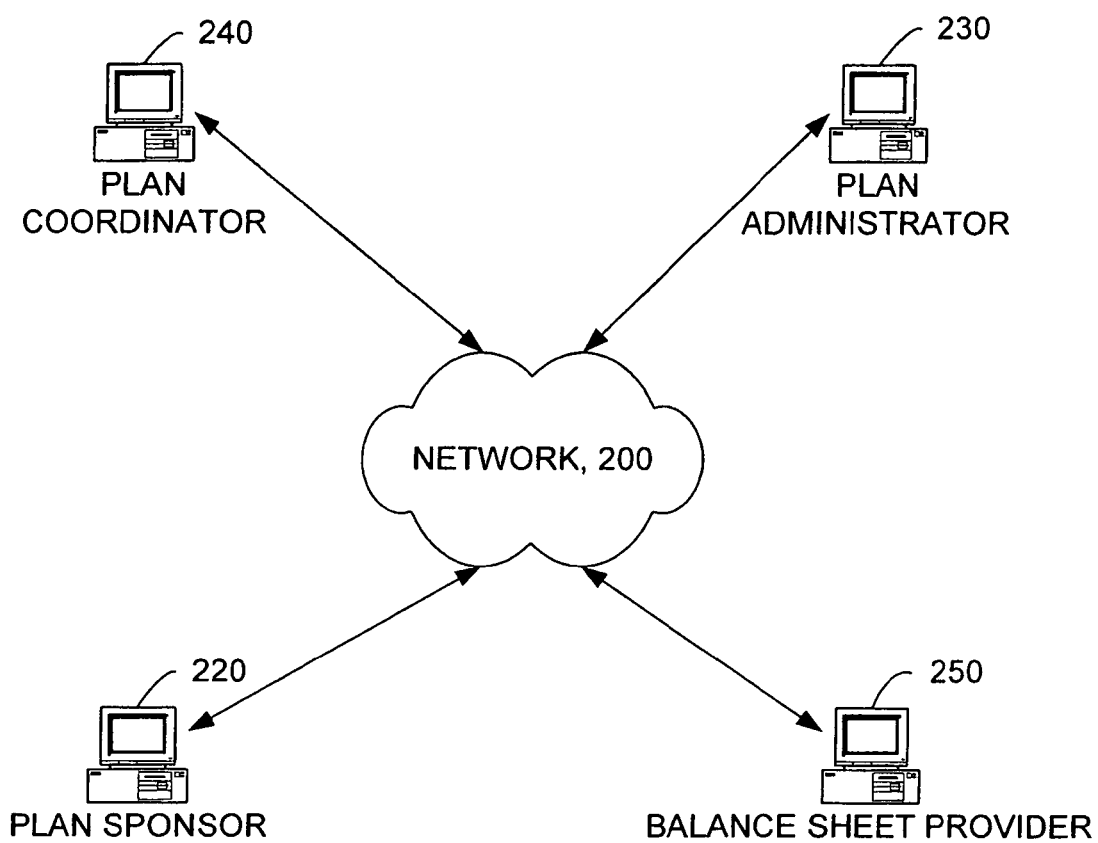
FIG. 3 is a diagram of a computer system for administering the hedging of an employee deferred compensation plan in accordance with an embodiment of the invention.

The process flows described herein performed by the plan coordinator 140 and other parties may be computer-implemented using known computer and networking techniques, for example, by the computer system depicted in FIG. 3. Referring to FIG. 3, such a system may include individual computer workstations that are used by the involved parties, including plan coordinator computer 240, plan administrator computer 230, balance sheet provider computer 250, and plan sponsor computer 220. (Each computer may comprise more than one computer.) The computers 220, 230, 240 and 250 may communicate via a network 200, which may include the Internet, dial-up links, or a private network, for example.

The computers 220, 230, 240 and 250 may comprise desktop computers (e.g., PCs), network terminals, servers, workstations, or other general purpose computers, and may include a CPU, such as any commercially available central processing unit (e.g., from Intel, Motorola, etc.); volatile and nonvolatile memory devices such as RAM, ROM, and magnetic or optical discs; input devices such as a keyboard, mouse, touch screen, or electronic stylus; output devices such as monitors and/or printers; communication interface hardware such as a modem, fax/modem, or network card; and software including operating system software, user interface software, and applications such as spreadsheets, word processors, and clients for email and other messaging systems. The computers may contain and execute software to perform the various calculations, communications, report generation, and database functions as described herein. The software may be stored on a computer program product such as a disk, where the software is loaded into the memory of the computer to enable it to be executed and carry out the desired functions as disclosed herein. The memory devices may also store a database, e.g., commercial databases such as DB2/2 for OS/2, Microsoft Access for Windows, and Oracle's SQL server, for storing information needed to support and administer the system as described herein.

The computers and storage devices depicted in FIG. 3 provide the means for performing the methodology, functionality, tasks and methods described herein. Such means are known to those of skill in the art and therefore are not discussed herein.

Reports

FIGS. 4-18 depict sample reports created by the plan coordinator 140 in accordance with the invention, at various times, e.g., periodically, such as monthly, or aperiodically, or upon the occurrence of an event or events, e.g., a termination or re-allocation request, and at other times. The preparation of these reports, which provide information to the plan sponsor and the balance sheet provider, frequently involve data conversion. For example, aggregate level information provided by a balance sheet provider is disaggregated and provided to the plan sponsor, and plan participant level information provided by the plan sponsor is aggregated and provided to the balance sheet provider. The information contained in these reports assists the plan sponsor in determining and tracking its net exposure under the hedged portion of an NQDC plan, and is useful for tax purposes.

Since the reports depicted in FIGS. 4-18 are sample reports, amounts reported in the different reports for the same item may not track from report to report in all reports.

When report information is specified as being provided by or otherwise coming or originating from a particular party, this is meant in a broad sense and the information may be provided by or on behalf that party, or calculated on behalf of that party, etc. The reports depicted in the reports are exemplary, and reports encompassed by the invention may vary from those shown in the drawings, e.g., in form, presentation and content and any report may be broken up into two or more reports, and reports may be combined, etc. Reports may also be customized or tailored in accordance with a plan, or for a plan sponsors, or in accordance with a hedge process, or for a balance sheet provider, etc.

The sample reports depicted in FIGS. 4-18 relate to a NQDC Plan in which the plan sponsor 120 is Plan Sponsor X (or Y), the balance sheet provider is Balance Sheet Provider A, the specified indices are S & P and Janus Worldwide, the hedging benchmarks are also S & P and Janus Worldwide, there are three plan participants, the reports are issued monthly or to reflect a termination event, the plan covered the period Jan. 31, 2002 to Dec. 31, 2002, and that the report dates are given in the respective report. A report relating to a specific plan participant identifies the participant and the Swap # for that participant. The number of plan participants, hedge agreements, events (e.g., a partial withdrawal), etc. has been minimized in the sample reports for the purpose of ease of description. From the disclosure herein, it will be evident to those of skill in the art to administer larger plans, etc., and to provide corresponding reports.

To simplify the description of the reports, the following convention is generally followed. The name or title of each report is capitalized. Similarly, when an item being discussed is also a column heading or entry in the related report, it is capitalized (initial capital). For example, reference to Tax Basis in the DC Plan Liability report depicted in FIG. 4 is also a reference to the column heading "Tax Basis," and reference to Weighted Unit Price in the Deferred Compensation Plan Details report depicted in FIG. 6 is also a reference to the column heading "Weighted Unit Price." Column headings and the like in the reports are typically self-explanatory in view of the description herein and meaning in the trade. Reference to "account" is simply the total of the particular item referred to as "an account." For example, implicit cash account is the total implicit cash at the time of a particular transaction.

FIGS. 4 & 5

Figure 5:
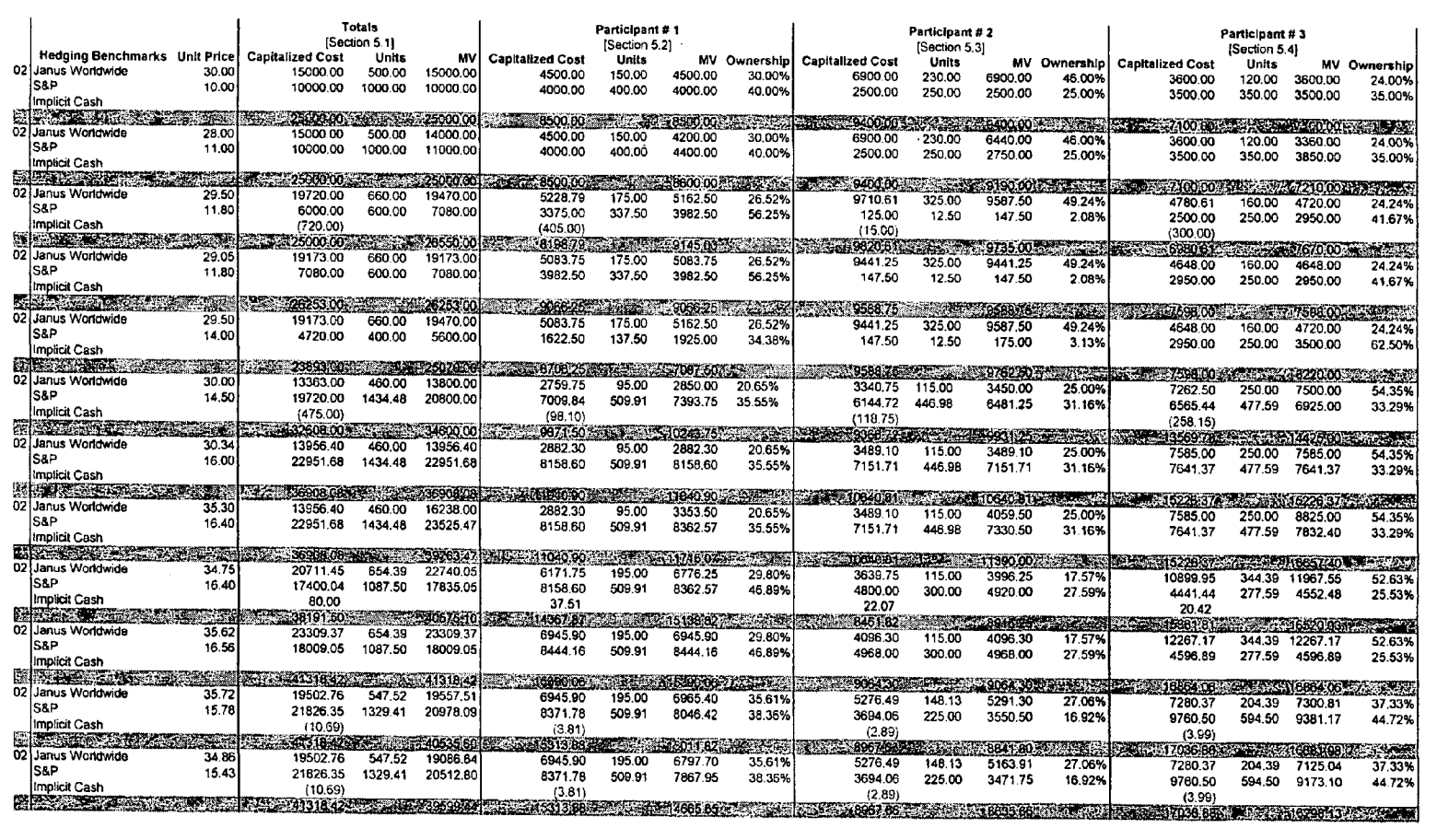

The spreadsheets depicted in FIGS. 4 and 5 provide sample summaries of deferred compensation plan balances on plan participant and aggregate levels, and corresponding swap balances on aggregate and plan participant levels in accordance with the invention. These spreadsheets illustrate data that is accumulated in accordance with the invention during administration of a sample NQDC plan, and is available for use and reporting in the administration of the plan, although all data may or may not be presented in a report format. Option and forward balances are not presented in these figures as the sample deferred compensation plan is hedged by using swaps alone. However, in situations where options and forwards are used, that information would be presented in these spreadsheets as well.

The DC Plan Liability spreadsheet depicted in FIG. 4 summarizes a sample NQDC Plan consisting of three participants 110 accumulated over a twelve-month period (Jan. 1, 2002 to Dec. 31, 2002). In practice, a plan may have any number of participants 110. This spreadsheet outlines plan participant information based on information provided by the plan administrator and market information. The plan coordinator 140 processes and aggregates this information into summary and detail reports, some of which are described below.

In the DC Plan Liability spreadsheet of FIG. 4, the first three sections (4.1-4.3) represent individual data for Participants, 1, 2 and 3, while the last section (4.4) provides the totals for the plan. The Date is the date on which new deferral, reallocation, and withdrawal instructions are effective. In this case, the dates in the Date column are set for each month-end. In this sample plan, Janus Worldwide ("Janus") and S&P are identified as the Specified Indices. Unit Price is market value of one unit of each respective specified index at month-end. Tax Basis is the original deferred amount or original amounts notionally invested by a participant in a specified index. Units are number of units the participant notionally holds in each specified index. MV is the market valuation of the total investment in each specified index, and is equal to the Unit Price multiplied by the number of Units. Ownership is the percentage each participant owns of the total amount of a specified index notionally invested in the plan, which can be calculated as the ratio of the participant's Units in the index to Totals Units of that index in the plan, or as the ratio of the participant's MV for the specified index to the Totals MV for that index. Ownership percentages for each specified index should total 100%.

The DC Plan Liability spreadsheet depicted in FIG. 4 can be used to evaluate a participant's participation in the sample NQDC Plan, for example, the participation of Participant #2, as follows. (Reference is to FIG. 4 until indicated otherwise.) The first deferral occurred on Jan. 31, 2002 at the Unit Price of $30.00 for Janus and $10.00 for S&P. Participant #2 notionally invests in 230.00 Units of Janus and 250.00 Units of S&P, resulting in a Tax Basis of $6900.00 notionally invested in Janus and $2500.00 in S&P. Since the new deferrals were made at market value, the MV is the same as the Tax Basis on this date. The Ownership percentages are 46.00% of Janus and 25.00% of S&P. The 46.00% figure for example, is calculated by dividing the Units of Janus that Participant #2 held in January by the total number of Units of Janus in the plan in January (230.00/500.00). (Totals are in Section 4.4.)

From Jan. 31, 2002 to Feb. 28, 2002, no changes were made to the plan except the MVs have changed. The new Unit Prices are $28.00 for S&P and $11.00 for Janus, resulting in MVs of $6440.00 and $2750.00, respectively. The Ownership percentages have not changed, as no changes were made to the Total number of Units in the plan.

In March 2002, Participant #2 reallocates 237.50 Units from S&P at a Unit Price of $11.80 to Janus. The reallocation results in 95.00 new Units of Janus at a Unit Price of $29.50. The Tax Basis changes accordingly to reflect the new positions. The 237.50 Units are taken out of the Tax Basis for the S&P index at the average cost per unit of $10.00 (=$2500.00/250.00 units), as of the previous effective date (in this example, Feb. 28, 2002), resulting in a total reduction of $2375.00 in the Tax Basis for S & P. That sum is added to the Janus Tax Basis. All of these changes are shown on the next effective date, Mar. 31, 2002. The Tax Basis for Janus is $9275.00 for 325.00 Units, and the Tax Basis for S & P is $125.00 for 12.50 Units. The Unit Price for Janus is $29.50 for a MV of $9587.50, and the Unit Price for S & P is $11.80 for a MV of $147.50. The ownership percentages are now 49.24% of Janus and 2.08% of S&P.

In May, 2002, Participant #2 makes no changes, but there is a change in the Units Totals (Section 4.4) of S&P notionally in the plan. As a result, Participant #2's S&P Ownership percentage changes to 3.13%.

The next change to Participant #2's portfolio occurs in June 2002 when 210.00 units of Janus are reallocated at a unit price of $30.00 to S&P for 434.48 Units at $14.50. The calculations are similar in process as those for the March reallocation, and result in a tax basis of $3281.92 for 115.00 units of Janus and $6118.08 for 446.98 units of S&P. The MVs have changed, as to be expected. The ownership percentages have changed to reflect the new allocations and are now 25.00% for Janus and 31.16% for S&P.

In September 2002, Participant #2 withdraws a redemption amount of $2410.50 (MV) from S & P, which is equivalent to 146.98 Units (MV of $2410.50 divided by Unit Price of $16.40. The adjustment in the Tax Basis is negative $2011.80, obtained by multiplying the number of Units (146.98) by the average cost per unit ($13.69). The average cost per unit of $13.69 is obtained by dividing the prior period's Tax Basis ($6118.08) by the number of Units (446.98). The Tax Basis on Sep. 30, 2002 for Janus is unchanged ($3281.92 for 115.00 units), and the Tax Basis of S & P is changed to $4106.28 for 300.00 units.

In November 2002, Participant #2 makes a reallocation from S&P to Janus. The transfer involves 75.00 Units of S&P at a Unit Price of $15.78 and 33.13 Units of Janus at a Unit Price of $35.72. The S&P Tax Basis is reduced by $1026.57 (MV of $4106.28 as of Oct. 31, 2002 divided by 300.00 Units)×75.00 transferred Units) to a new Tax Basis of $3079.71. The Janus Tax Basis is increased by $1026.57 to $4308.49.

In December 2002, Participant #2 does not make any new deferrals, reallocations, or withdrawals, so the only changes are in the MVs.

Referring now to the Swap Positions spreadsheet depicted in FIG. 5, swap positions are summarized for a hedge of the plan represented by the DC Plan Liability spreadsheet of FIG. 4. This spreadsheet provides the sample swap position summaries based on information provided by the balance sheet provider 150. The plan coordinator 140 processes and disaggregates this information into summary and detail reports, some of which are described below. The discussion below provides sample calculations for disaggregating plan participant level information to provide the sample figures set forth in the spreadsheet of FIG. 5. The Swap Positions spreadsheet depicted in FIG. 5 introduces the concept of "implicit cash," discussed below.

Implicit Cash: Implicit cash is the unsettled gains/losses arising from reallocations. In the Swap Positions spreadsheet depicted in FIG. 5, implicit cash is reported under Capitalized Cost. Referring to FIG. 5, during March, for example, Participants #1, 2, and 3, made reallocations from S&P to Janus. When there is a reallocation, the Capitalized Cost, which reflects the amount invested in the NQDC Plan Swap Hedge, changes accordingly. The amount subtracted from the aggregate S&P Capitalized Cost (Section 5.1) for the plan is a function of the average cost of each unit (according to the last effective date's numbers) multiplied by the number of units reallocated. Average price is used rather than market price because capitalized cost reflects the cost to the balance sheet provider 150 of the hedge. Therefore, since capitalized cost amounts are not segregated by each different price at which the hedging benchmarks are purchased, a weighted average price works well to reflect costs incurred. In the sample Swap Positions spreadsheet depicted in FIG. 5, a total of 400.00 Units of S&P are reallocated at the average price of $10.00 (obtained by dividing the total Capitalized Cost ($10000.00) by the total Units (1000.00)), for a reallocated total of $4000.00 (average price*reallocated number of units), which is subtracted from the S&P capitalized cost. The MV of the amount subtracted from S&P ($4720.00) is equal to the market Unit Price ($11.80) at the time of purchase multiplied by the reallocated number of units (400.00). The new hedge (160 Units of Janus at $29.50 per unit) purchased by the balance sheet provider 150 would cost this market amount. Therefore, $4720.00 is added to the capitalized cost for Janus, as again, capitalized cost is meant to reflect costs incurred. As there is a difference between the new hedge capitalized cost value and the old hedge capitalized cost value related to the reallocation, implicit cash arises from the reallocation. In this case, Implicit Cash is –$720.00, which is the difference between the capitalized costs of the reallocated Units of S & P and Janus (4000.00–$4720.00). This is a negative value to the balance sheet provider 150 because it is $720.00 of unsettled gain not yet paid to the plan sponsor 120.

Other methods of calculating implicit cash may be used depending on the specific structure of the NQDC plan swap hedge.

At the time of NQDC plan swap hedge reset, the swap index leg is settled, the capitalized costs are set to the current market values, and the implicit cash account balance is reset to zero. Any index settlement resulting from the implicit cash account is transferred to the index settlement account of the hedging benchmark in which the balance was earned. Then the capitalized costs are all adjusted to market value and the implicit cash account is reset to zero. Referring to FIG. 5, at the time of the index settlement in April 2002, the $720.00 of implicit cash owed to the plan sponsor 120 is added to the index settlement for S&P because that is the hedging benchmark in which the gain of $720.00 was made, before Participants 1, 2, and 3, reallocated in March.

With reference again to the drawings, in the Swap Positions spreadsheet of FIG. 5, the first section (5.1) represents the totals for the NQDC Plan Swap Hedge while the last three sections (5.2-5.4) represent the figures for Participants, 1, 2 and 3. This ordering is consistent with the methodology of first receiving the NQDC Plan Swap Hedge totals from the balance sheet provider 150, then disaggregating the plan participant level information for participants 110 from the totals. Under the leftmost column are Dates on which the NQDC Plan Swap Hedges are executed. The Hedging Benchmarks are Janus Worldwide (Janus) and S&P. Implicit Cash is carried under Hedging Benchmarks. The Unit Price reflects the market value of one Unit of each respective hedging benchmark at month-end. Units reflect the number of units of which the balance sheet provider 150 has committed to pay the return to the plan sponsor 120. MV is a market valuation of the total notional investment in each hedging benchmark, and is equal to the Unit Price multiplied by the number of Units. Ownership is the percentage each participant 110 owns of the total amount notionally invested in the hedging benchmark of the NQDC Plan Swap Hedge. Ownership percentages of all plan participants 110 should total to 100% for any given hedging benchmark. In this case, the Ownership percentage per participant 110 is equal to the participant 110's ownership percentage in the NQDC Plan specified index corresponding to the hedging benchmark of the NQDC Plan Swap Hedge. Additionally, if options and/or forwards were used to hedge this sample deferred compensation plan, they would be presented in this spreadsheet as well.

The portions of the NQDC Plan Swap Hedges allocated to Participant #2 can be examined through FIG. 5. In this sample NQDC Plan Swap Hedge, it is assumed that the hedging objective is to hold the units between the deferred compensation plan elections and the NQDC Plan Swap Hedge equal. However, in other instances, other variables may be held constant instead or in addition, such as market valuation amounts. With reference to FIG. 5 until indicated otherwise, in January 2002, the participant 110's Ownership percentages in the NQDC Plan are 46.00% of Janus and 25.00% of S&P (see FIG. 4). Based on these Ownership percentages, the participant 110's corresponding NQDC Plan Swap Hedge Units and Capitalized Cost are calculated. The number of Units that Participant #2 holds in any given hedging benchmark is calculated by multiplying the Ownership percentage the participant 110 owns in the corresponding specified index and the total number of Units (Totals are given in Section 5.1) in the NQDC Plan Swap Hedge for that hedging benchmark. For example, the Units allocated to Participant #2's Janus account are 230.00 (46.00%*500.00 total Units). Participant #2 has 250.00 Units (25.00%*1000.00 total Units) of S&P. Capitalized Cost for Participant #2 in any given hedging benchmark is calculated by taking the Ownership percentage in the corresponding specified index*total Capitalized Cost (in Section 5.1) in the plan for the hedging benchmark. The resulting Capitalized Cost for Janus is $6900.00 (46.00%*$15000.00) and $2500.00 (25.00%*$10000.00) for S&P. The MVs reflect the unit prices given in the report.

In March 2002, Participant #2's Ownership percentages change because of reallocations made in the NQDC Plan. The new Ownership percentages are 49.24% of Janus and 2.08% of S&P. These changes resulted from reallocations made in March by all of the three participants in this sample plan. When these reallocations were used to re-weight the NQDC Plan Swap Hedge, implicit cash resulted, so in addition to making adjustments to Participant #2's capitalized cost amounts, an amount must be attributed to Participant #2's Implicit Cash account. Implicit Cash is calculated on the participant level as a function of Ownership percentage in the corresponding specified index (Hedging Benchmark) from which the reallocation is made and the total Implicit Cash (Section 5.1) for the plan. In this case, the Implicit Cash attributable to Participant #2 is −$15.00 (2.08%*−$720.00).

In April 2002, an index settlement equaling the difference between the current MV and the previous Capitalized Cost is made, on the aggregate level. Then the index settlement is attributed to each participant as a function of Ownership percentages in the corresponding specified indices. (Index settlements are discussed in more detail below in connection with FIGS. 9 and 10.) In the sample NQDC Plan represented in FIG. 5, index settlements occur every three months, so the July and October figures also include index settlements. Index settlements dates and frequency may vary. For the sample represented by FIG. 5, the April 2002 index settlement occurs at the prices of $29.05 for Janus and $11.80 for S&P. The MVs, multiplied by the current number of Units in each respective hedging benchmark, equal the new Capitalized Cost amounts for the aggregate plan across all participants. In other words, the Capitalized Cost is reset at MV. Then the Capitalized Cost per Hedging Benchmark is calculated for each individual participant as a function of Ownership percentage, as described above.

In September 2002, Participant #2 makes a withdrawal request of $2410.50 of his NQDC Plan's market valuation, so the balance provider 150 must close out part of the NQDC Plan Swap to reflect this change. In addition to the withdrawal, there is a new deferral made by Participant #1 of $3475.00 MV (100.00 units) to Janus and a reallocation of $3279.92 MV (146.98 units) of S&P made by Participant #3, transactions also affecting the NQDC Plan Swap Hedge re-weighting this period. The NQDC Plan Swap Hedge is reduced by 346.98 Units of S&P and increased by 194.39 Units of Janus, resulting in 1087.50 total Units (Section 5.1) of S&P and 654.39 total Units of Janus. The S&P Capitalized Cost is reduced by $5551.64, to $17400.04, the capitalized cost equivalent to the prior period capitalized cost less withdrawals and reallocations from S&P at average weighted cost. The new Capitalized Cost ($17400.04) is obtained from the previous Capitalized Cost ($22951.68) divided by the previous total Units (1434.48) multiplied by the current units (1087.50).

A reallocation from a hedging benchmark is the equivalent to a withdrawal from a fund from the balance sheet provider's view because the balance sheet provider must close out part of the NQDC Plan Swap Hedge as a result, which is the same action taken when a withdrawal is made. The only functional difference is that no tax event is triggered, as no money is being paid out to the participants 110 when a reallocation from a hedging benchmark occurs. A reallocation to a hedging benchmark is functionally equivalent to a new deferral to the balance sheet provider 150 because the balance sheet provider 150 must increase the number of units in the NQDC Plan Swap Hedge as a result. Referring to FIG. 5, the Janus Capitalized Cost is increased by $6755.05, to $20711.45, which is the prior period Capitalized Cost plus the new deferral and reallocation at MV (prior period capitalized cost+new deferral and reallocation units*market price=$13956.40+ (194.39 units*$34.75)).

Participant #2's capitalized cost amounts are again a function of ownership percentage in the hedging benchmarks. In addition, Participant #2 is allocated a portion of implicit cash, which resulted from the reallocation transaction. The portion allocated to Participant #2 is a function of the participant 110's ownership percentage in S&P, the hedging benchmark in which the implicit cash was earned. Referring to FIG. 5, the $22.07 Implicit Cash amount for Participant #2 for September equals the total Implicit Cash for the plan, $80.00 (Section 5.1), multiplied by Participant #2's current Ownership percentage in S&P of 27.59%. Also, implicit cash is allocated to Participant #2 because the NQDC Plan Swap Hedge overall realizes implicit cash, although Participant #2 is not responsible for the reallocation leading to the implicit cash. Implicit cash can also be calculated so that only participants 110 who make the reallocations are allocated implicit cash. The method chosen for the calculation depends on the specific NQDC plan swap hedge process employed.

In November, reallocations are made by Participants #2 and #3, resulting in a total Capitalized Cost (Section 5.1) for Janus of $19502.76 (547.52 units), for S & P of $21826.35 (1329.41 units) and for Implicit Cash of −$10.69. Even though Participant #2 made a reallocation from S&P, Participant #2's share of implicit cash is based on the participant 110's ownership percentage in Janus because the reallocation Participant #3 made from Janus is greater in amount and units than Participant #2's reallocation. Implicit cash can also be calculated individually so that each participant 110's implicit cash in the NQDC Plan Swap Hedge depends on that participant 110's specific reallocation in the NQDC Plan. Participant #2's Capitalized Cost is again a function of ownership percentage, resulting in $5276.49 of Janus, $3694.06 of S&P, and −$2.89 of implicit cash.

In December, no changes are made to the NQDC Plan, and the NQDC Plan Swap Hedge is actually hedging the units of the plan, so the only changes are in market valuation, based on market prices on the settlement date in December.

FIGS. 6 & 7

FIGS. 6 and 7 depict sample NQDC plan-related reports that are based on information that comes from the plan administrator 130 (e.g., process flow arrow 2 in FIG. 2). These reports may be used for reconciliation purposes with the plan administrator 130 during administration of a NQDC plan swap hedge, as represented by the process flow arrow designated 3 in FIG. 2. They are also provided to the plan sponsor 120, as represented by the process flow arrow 8 in FIG. 2, during a transaction results summary.

The sample Deferred Compensation Plan Details report depicted in FIG. 6 provides a picture, on a plan participant level, of participant #2's current deferred compensation plan, including any new Event (e.g., (new deferrals, reallocations, and withdrawals) since the last Effective Date, the Tax Basis Amount and the change in the Market Valuation Amount due to the new Event(s). This report also provides post-reallocation plan values at the bottom of the report under "Employee Funds Current Summary," for a given plan participant, for each specified index, such as the number of Units, Unit Price, Tax Basis, Market Valuation and Ownership %. This information is presented for each specified index in which the deferred compensation for that participant is allocated. The NQDC Plan Swap Hedge Agreement may be considered to be comprised of individual mini-hedges for each new Event. The information provided on this report is plan sponsor-related information on a plan participant level. This report is created periodically. The information provided on each periodic report is accumulated and stored for the life of the deferred compensation plan and, hence, is historical information relating to the plan on a plan participant level.

The Deferred Compensation Plan Details report depicted in FIG. 6 covers the period Mar. 1, 2002-Mar. 31, 2002 for Participant #2. The Event reported in this report is a reallocation, which is indicated to be from S&P to Janus under the "Allocated or Reallocated to" and "Reallocated From Or Withdrawn From" columns. This reallocation decreases the S&P Tax Basis by $2375.00 (237.50 Units withdrawn at the Weighted Unit Price of $10.00 each) and increases the Janus Tax Basis by the same amount. The Current Valuation Amount (MV) is $2802.50.

The Deferred Compensation Plan Summary report depicted in FIG. 7 reports an aggregation of all plan participant level information for one plan for one plan sponsor. The information is provided as of the Effective Date given at the top of the report (Mar. 31, 2002). Section 7.1 reports the current information as of the Effective Date. Section 7.2 reports the same information, but as of the previous Effective Date (February 2002). Section 7.3 reports the change in the same information between the current and previous effective dates. The reported information in the Deferred Compensation Plan Summary report depicted in FIG. 7, as of the respective Effective Dates, includes the total number of Units in the plan, the Tax Basis, obtained by multiplying Units by Weighted Unit Price, and the Market Valuation, obtained by multiplying the Unit Price by the number of Units. These plan sponsor NQDC Plan obligations will subsequently be summarized and matched with the actual NQDC Plan Swap hedge results and the net exposure will be reported by the plan coordinator 140 to the plan sponsor 120 on the aggregate level. (See, e.g., the sample report depicted in FIG. 11.) The deferred compensation plan information and report(s) are passed in the process flow represented in FIG. 2 by the arrows designated 3a, 3b, and 8.

The information provided on this report is plan sponsor-related information on an aggregate level. This report is created periodically. The information provided on each periodic report is accumulated and stored for the life of the deferred compensation plan and, hence, is historical information relating to the plan on an aggregate level.

FIG. 8

The sample NQDC Plan Swap Hedge Re-Weighting report depicted in FIG. 8 is generated using information on the aggregate level from the plan administrator 130 and balance sheet provider 150 (e.g., process flow arrows 2 and 6 in FIG. 2). This report communicates to the balance sheet provider 150 information for use by the balance sheet provider 150 to re-weight the NQDC Plan Swap Hedge based on a reallocation or reallocations requested in the current time period as of the Effective Date. In other words, this report serves as a request for the balance sheet provider 150 to change the hedge in accordance with changes that would better hedge the plan sponsor 120's liability, as determined by the plan coordinator 140. This request is communicated in the administration of a NQDC plan swap hedge process in the process flow represented by the arrow 4 in FIG. 2. The reported NQDC Plan Swap Hedge re-weighting information is based on the difference between the current deferred compensation plan balance ("Mar. 31, 2002 DC Plan," Section 8.1, received during, e.g., process flow arrow 2 in FIG. 2, for this period) and the last NQDC plan swap hedge results ("Actual Feb. 28, 2002 NQDC Plan Swap Hedge," Section 8.2, received during, e.g., process flow arrow 6 in FIG. 2, for the last period). Section 8.1 reports the following information: Specified Indices, Units, Market Unit Price and Market Valuation. Section 8.2 reports the following corresponding information for each Hedging Benchmark: Units, Weighted United Price, Capitalized Cost, Unit Price and Market Valuation resulting from the last NQDC plan swap hedge. Section 8.3 reports the Monthly Re-Weighting Request, which is the difference corresponding to information in Sections 8.1 and 8.2 (Units, Unit Price and Market Valuation. For instance, the 160.00 Units of Janus in Section 8.3 is the difference between the 660.00 Units of Janus in Section 8.1 and the 500.00 Units of Janus in Section 8.2.

Section 8.3 in the FIG. 8 sample NQDC Plan Swap Hedge Re-Weighting report indicates whether the hedge should be increased or decreased based on the latest deferred compensation liabilities and the last hedge results. A positive number of Units or Market Valuation in Section 8.3 indicates that the plan sponsor's liability under the hedge portion of the plan is more than the NQDC Plan Swap Hedge results by the reported amount, which means that the plan sponsor can increase the hedge amount to better track the deferred compensation liability. A negative number, on the other hand, indicates that the plan sponsor's liability under the hedge portion of the plan is less than the NQDC Plan Swap Hedge results by the reported amount, which means that the plan sponsor must decrease the hedge amount to better track its deferred compensation liability. For instance, the negative 400.00 Units of S&P in Section 8.3 indicate the NQDC Plan Swap Hedge can be reduced by 400.00 Units of S&P. This reduction should result in a $3920.00 reduction of market valuation, reported as "Market Valuation" in Section 8.3. The Unit Price amount in Section 8.3 indicates the amount that the market Unit Price has changed from the previous reported period (Section 8.2) to the current reported period (Section 8.1). The $0.80 (under Unit Price in Section 8.3) for S&P indicates that S&P has appreciated $0.80 from Feb. 28, 2002 to Mar. 31, 2002.

In variations of the sample NQDC Plan Swap Hedge Re-Weighting report depicted in FIG. 8, the Sections 8.1 and 8.2 information is not included, and all of the Section 8.3 information is reported, or only the number of units by which a hedge should be increased or reduced, or only the units information is reported in Sections 8.1, 8.2 and 8.3, etc. The information reported in a particular variation of this report may be responsive to a balance sheet provider 150's informational needs and preferences.

The information used to provide the reports depicted in FIGS. 7 and 8 is obtained in the process flow depicted in FIG. 2 as represented by the arrows designated 2 and 6, and the reports may be provided to the plan sponsor 20 in process flow depicted in FIG. 2 as represented by the arrow designated 8.

FIGS. 9 & 10

The sample Swap Summary and Swap Details reports depicted in FIGS. 9 and 10 respectively report aggregate level information and related plan participant level information based on information provided by the balance sheet provider 150. These reports may be used for reconciliation purposes with the balance sheet provider 150 during administration of a NQDC plan swap hedge, as represented by the process flow arrow designated 7 in FIG. 2. They are also provided to the plan sponsor 120, as represented by the process flow arrow 8 in FIG. 2, during the transaction results summary.

The sample Swap Summary report depicted in FIG. 9 is based on information from the balance sheet provider (e.g., process flow arrow 6 in FIG. 2) for one plan sponsor 120. Section 9.1 summarizes Capitalized Cost and Market Valuation information for the Hedging Benchmarks in the Hedge Agreement for the plan sponsor. This section provides the following information relating to the identified Hedging Benchmarks, total number of Units in the swap, with respect to Capitalized Cost, the Unit Price and Capitalized Cost amount, and with respect to Market Valuation, the Unit Price and the Market Valuation amount. Section 9.2 summarizes payment information between the balance sheet provider and the plan sponsor. Section 9.2, left side, provides balance sheet provider payment information for each Hedging Benchmark, as follows: the Index Reset Frequency, Next Index Settlement Date, Next Index Reset Date, Index Settlement (on a report basis) and Cumulative Index Settlement. Section 9.2, right side, provides plan sponsor interest rate-related payment information for each Hedging Benchmark, as follows (LIBOR is used as the interest rate in this example): LIBOR Reset Frequency, Next LIBOR Settlement Date, Next LIBOR Reset Date, LIBOR Rate, Spread, Next LIBOR Settlement Amount and Cumulative LIBOR Payments. The payment information summarized in this report is discussed below.

Payment Information: The two major payments reported in the Swap Summary report (FIG. 9) involved in the swap hedge are the index settlement and the interest rate settlement amounts. (Payments for options and forwards, which are not involved in the plan represented by FIG. 9, would follow the standard form for these types of products.)

As mentioned above, the index settlement may be determined by subtracting the previous capitalized cost from the market valuation of the hedging benchmark at the time of settlement. Any amounts settled at the time of withdrawals (termination payments) are also index settlements. The index settlement is paid to the plan sponsor 120 by the balance sheet provider 150 when the hedging benchmark has appreciated in value (the market valuation is greater than the capitalized cost) and paid by the plan sponsor 120 to the balance sheet provider 150 when the hedging benchmarks have decreased in value (the capitalized cost is greater than the market valuation). In the sample report depicted in FIG. 9 (effective as of Mar. 31, 2002), the Index Reset Frequency is 3 months, and index leg of the NQDC plan swap hedge has not been reset.

Still referring to FIG. 9, the interest rate settlement amount is determined by multiplying the total interest rate, which is the sum of LIBOR Rate and the Spread in Section 9.2, by the current Capitalized Cost (Section 9.1). The interest rate settlement amount is paid the balance sheet provider 150 by the plan sponsor 120 in exchange for the swap portion of the NQDC plan swap hedge services, as discussed above in connection with FIG. 1. For example, in the sample report depicted in FIG. 9, payments are made monthly.

As shown in FIG. 9, based on the current S&P Capitalized Cost of $6000.00, LIBOR Rate of 2.00%, Spread of 1.00%, and an accrual basis of actual/360, the resulting LIBOR settlement amount for the S&P Hedging Benchmark (to be paid for the next month) is 3% per year*$6000.00*30/360, or $15.00 (not on report). To obtain the Next LIBOR Settlement Amount, the LIBOR settlement amount on implicit cash ($1.20, calculated without a spread, which may or may not be applied to implicit cash LIBOR settlement amounts) must be deducted, which yields the Next LIBOR Settlement Amount of $13.80 in Section 9.2. In this case, the payment amounts related to implicit cash are attributed to S&P. The LIBOR charge on the implicit cash account of $1.20 is subtracted from this amount because the implicit cash balance resulted from earnings in the S&P hedging benchmark. If implicit cash resulted from a reallocation from Janus, then the payment amounts would be attributed to Janus. This LIBOR payment is aggregated across the different hedging benchmarks and the implicit cash account into a total LIBOR settlement amount due. The cumulative accounts in Section 9.2

(both the cumulative index settlement and cumulative LIBOR payments) are cumulative payments to date, over the course of the swap agreement or a specified time period, such as a year. The Cumulative Index Settlement includes the current Index Settlement, which is paid in the current month, while the Cumulative LIBOR Payments total does not include the Next LIBOR Settlement Amount because the settlement amount is for the next month.

The Swap Summary report depicted in FIG. 9 specifies the Index Reset Frequency (the length of time between index settlement payments), the Next Index Reset Date (the next date on which the index leg of the swap is reset), and the Next Index Settlement Date (the next date on which the index settlement will be calculated) for both the index settlement and the interest rate benchmark settlement (LIBOR in this report), on which the payments for the NQDC Plan Swap Hedges are based. The LIBOR Reset Frequency is the length of time between interest rate benchmark updates. The Next LIBOR Settlement Date is the next date on which the payment to the balance sheet provider 150 from the plan sponsor 120 for the swap hedge is calculated. The Next LIBOR Reset Date is the next date on which a new interest rate is applied to the swap hedge.

The sample Swap Summary report depicted in FIG. 9 also tracks the Current Swap Income/(Expense), YTD Swap Income/(Expense), and Cumulative Swap Income/(Expense) in Section 9.3. The Current Swap Income/(Expense) column indicates the gains/(losses) from the swap portion of the NQDC Plan Swap Hedge, and is calculated by subtracting the Capitalized Cost from the Current Market Valuation (Section 9.1), subtracting any previous swap income gains (or adding back any swap expense losses), and then adding the cumulative index settlements.

The information provided on this report is balance sheet provider-related information on an aggregate level, also referred to as hedging results. This report is created periodically. The information provided on each periodic report is accumulated and stored for the life of the NQDC plan swap hedge and, hence, is historical information relating to the hedge on an aggregate level, also referred to as cumulative hedging results.

The sample Swap Details report depicted in FIG. 10 provides a summary of outstanding swaps for each plan participant 110. The Swap Details report may be generated by disaggregating the total swap information provided by the balance sheet provider 150, such as the aggregate level information provided in the Swap Summary report of FIG. 9, and may include all or part of the information found in the swap summary report.

The information provided on this report is disaggregated historical aggregate information relating to the hedge on a plan participant level. This report is created periodically. The information provided on each periodic report is accumulated and stored for the life of the NQDC plan swap hedge and, hence, is disaggregated historical aggregate information relating to the hedge on a plan participant level.

The cumulative index settlement and next LIBOR settlement amount reported in the FIG. 9 swap summary report are disaggregated by multiplying each by the participant 110's ownership percentage (FIG. 4) in the respective hedging benchmarks by the total cumulative index settlement and next LIBOR settlement amounts (FIG. 9). For instance, for Participant #2, whose ownership percentage of S&P is 2.08% (see FIG. 4, Section 4.2, effective Mar. 31, 2002), and the total next LIBOR settlement amount for S&P is $13.80, so the next LIBOR settlement amount for S&P is 2.08%×$13.80=$0.28. (See Section 9.2 of FIG. 9). Alternatively, the index settlement and next LIBOR settlement amount can be calculated per participant 110 rather than as a percentage of the total plan amounts.

The participant 110's swap income/(expense), YTD (Year-to-Date) swap income/(expense), and cumulative swap income/(expense) are calculated using the same equation as in FIG. 9, Section 9.3. The swap income/(expense) for the participant 110 is calculated by subtracting the Capitalized Cost from the Current Market Valuation, subtracting any previous swap income gains (or adding back any swap expense losses), and then adding the cumulative index settlements, all using the participant level information presented in this report. Alternatively, they can be calculated using the participant 110's ownership percentage in each hedging benchmark. For instance, the swap income/(expense) for S & P can be calculated by multiplying the total swap income/(expense) by the participant's ownership percentage, which may yield a different result from the FIG. 9 equation.

FIGS. 11 & 12

FIG. 11 depicts a sample Deferred Compensation Plan Exposure/Swap Position Summary report. As discussed above, the plan coordinator 140 maintains records to track the plan sponsor 120's net risk or exposure, based on differences between its deferred compensation liabilities owed to the participants 110 and its NQDC plan swap hedges. The Deferred Compensation Plan Exposure/Swap Position Summary report tracks this net exposure and is provided to the plan sponsor 120, e.g., monthly, to apprise the plan sponsor 120 on a current basis of its net exposure. This report may be generated from the deferred compensation plan summary (see FIG. 7), which reflects the plan sponsor 120's current liability, and swap summary (see FIG. 9), which reflects the current position for the hedge. This report is provided to the plan sponsor 120 during administration of a NQDC plan swap hedge process, as represented by the process flow arrow 8 in FIG. 2, during a transaction results summary.

Section 11.1 of the Deferred Compensation Plan Exposure/Swap Summary report (FIG. 11) provides the Swap Position Capitalized Cost and Market Valuation for each Hedging Benchmark. Section 11.2 provides, also for each corresponding Specified Index, the Tax Basis and the Market Valuation with respect to the Deferred Compensation Plan Exposure. If there were options and/or forwards in the sample plan, their relevant information would be incorporated here. Under Section 11.2 of this report, Units, Tax Basis, Unit Price, and Current Market Valuation of the deferred compensation plan are provided. Section 11.3 provides the Net Exposure summary, which gives, in Units and in Value, any differences between the plan sponsor's current aggregate liability under the hedged portion of the plan and the current NQDC Plan Swap Hedge. The sample report depicted in FIG. 11 indicates that there is no net exposure, either in Units or Market Valuation, and a zero tracking error.

Section 11.4 of the FIG. 11 report provides the Net Income/(Expense), the gains/(losses) that resulted from the NQDC plan swap hedge and deferred compensation plan liabilities for the given time period, e.g. one month, in this report. Swap Income/(Expense) is computed as described in FIG. 9. The Deferred Compensation Plan Income/(Expense) is the current market valuation less the prior period market valuation and new deferrals, plus new withdrawals. The combined (in this case, Monthly) Income/(Expense) is the sum of the swap income/(expense) and the deferred compensation plan income/(expense). In this report, the monthly income/(expense) is $1800.00+($1550.00)=$250.00. Additionally, YTD and cumulative income/(expense) totals for the swap hedge, NQDC plan, and net, are reported.

FIG. 12 depicts a sample Accounting report which provides accounting entries for the NQDC plan swap hedge and deferred compensation plan-related events for the report period, and supporting information therefor, which in this sample report includes the income/expenses for the Hedge Agreement (Swap Summary report, FIG. 9) and the DC plan (DC Plan Exposure/Swap Position report, FIG. 11), broken down by fund. The LIBOR Settlement Amount is also provided, which in this case, is the LIBOR amount settled in the last period as payment for the NQDC plan swap hedge for the current period. (Settlement arrangements will vary and will not necessarily be based on LIBOR.) Profit and loss is summarized on this report as well.

The information provided on this report consists of accounting entries and profit and loss relating to the deferred compensation plan, NQDC plan swap hedge, and net of both on an aggregate level. This report is created periodically. The information provided on each periodic report is accumulated and stored for the life of the NQDC plan swap hedge and, hence, is historical accounting entries and the cumulative profit and loss relating to the deferred compensation plan, NQDC plan swap hedge, and net of both. This report is provided to the plan sponsor 120 during administration of a NQDC plan swap hedge process, as represented by the process flow arrow 8 in FIG. 2, during a transaction results summary.

In the sample Accounting Report depicted in FIG. 12, the following is reported under "Change in Deferred Compensation Valuations." The positive $1550.00 Deferred Compensation Expense is the current DC Plan (Income)/Expense, i.e., the amount by which the plan sponsor's DC plan liability has grown in the last period. An offsetting addition to deferred compensation plan obligation of $1550.00 is also reported under Deferred Compensation Plan Obligation. A Deferred Tax Asset of $620.00, along with a corresponding reduction of $620.00 under Income Tax Expense, obtained by assuming a tax rate of 40% applied to the $1550.00 DC Plan (Income)/Expense. (The tax rate will vary in practice.)

The accounting entries in the Accounting Report (FIG. 12) also include receivable leg (Swap Valuation Receivable Leg) and payable leg (Swap LIBOR Interest on Payable Leg) accounting information. In the sample report, the receivable leg swap valuation includes a receivable of $1800.00 on the DC Plan Hedge, and a corresponding credit to deferred compensation expense, which is the Current Swap Income/(Expense). The payable leg ("Swap LIBOR Interest on Payable Leg") includes a Deferred Compensation Expense of $64.84 and a corresponding amount payable on the DC hedge, which is the LIBOR settlement amount for the period. The associated Deferred Tax Asset and Income Tax Expense (at 40%) on the $64.84 is $25.94. Since the LIBOR amount is settled also in this month, (reported under "Swap LIBOR Settlement") an entry is made to debit the DC Hedge account and credit the plan sponsor's Cash account for the amount of $64.84. If there were options and/or forwards in this particular NQDC plan swap hedge, then there would be accounting entries to reflect their presence in the hedge.

In the last portion of the report of FIG. 12, a profit and loss summary for the deferred compensation plan, hedge, and net is presented for the period. The total deferred compensation expense is $185.16 (the net amount credited to the deferred compensation expense account, with related entries labeled "A"), and the total tax is ($74.06) (the net amount credited to the tax expense account, with related entries labeled "B"). The net income/(expense) is therefore $111.10 ($185.16+ ($74.06)), and the pre-tax equivalent is $185.16; which equals the monthly income/(expense) of $250.00 (as reported in FIG. 11) less the LIBOR settlement amount of $64.84. Net income/(expense) is provided to summarize the net effect of hedging the deferred compensation plan with the NQDC plan swap hedge for the period. For instance, this month the plan sponsor 120 gained $111.10 because the swap hedge outperformed the growth of the deferred compensation plan liability.

FIGS. 13 & 14

Each NQDC Plan is hedged by a separate Hedge Agreement with a given term. However, not only can an NQDC Plan Swap Hedge terminate on its expiration date, but also at an earlier time, e.g., as a result of a termination, withdrawal, reallocation, reset or other termination event. Certain reports, for example the Termination Event Details report depicted in FIG. 13 and the Tax Report depicted in FIG. 14 are triggered by a termination event. In case of a termination event, they are provided to the plan sponsor 120 during administration of a NQDC plan swap hedge process, as represented by the process flow arrow 8 in FIG. 2, during a transaction results summary. A termination event requires the balance sheet provider 150 pay the plan sponsor 120 an amount based on the notional investment gains attributable to the capitalized cost amount associated with the termination event. If there is a loss, the plan sponsor 120 pays the amount of the loss to the balance sheet provider 150. The Termination Event Details report may be provided to the balance sheet provider 150 and the plan sponsor 120, and includes plan participant level information. The events, data and process flow surrounding the Termination Event Details report are as follows. The information provided in these reports reflects the respective portion of the hedge attributable to the plan participant making the withdrawal.

The sample Termination Event Details report depicted in FIG. 13 identifies the Participant, the Swap #, the Balance Sheet Provider. In this report, the Swap Start Date for the Swap Contract is Jan. 31, 2002. This report involves a partial withdrawal, but can also illustrate a full withdrawal. Participant #2 has made a partial withdrawal from the S & P Hedging Benchmark in his deferred compensation plan of market valuation of $2410.50, a value of the participant's choosing in this case. Alternatively, the participant can elect to withdraw by using different parameters, such as a certain number of units. In this case, $2410.50 is the Market Valuation Redeemed. $2410.50 divided by the current Market Unit Price ($16.40) results in the number of Redemption Units, 146.98. The redemption units multiplied by the Weighted Unit Price (=Capitalized Cost/Units) results in the Capitalized Cost Redeemed of $2351.71.

Under the NQDC Plan Swap Hedge Agreement, the balance sheet provider 150 pays the plan sponsor 120 the gain realized on the redemption, which (referring to FIG. 13) is the difference between the Market Valuation Redeemed and the Capitalized Cost Redeemed ($2410.50−$2351.69=$58.78). This is the Termination Payment Due to/from) Counterparty. When the termination payment is negative, it is due to the balance sheet provider 150 from the plan sponsor 120. This termination payment is also included in the Swap Summary report depicted in FIG. 9 (under "Cumulative Index Settlement",), and in the Swap details report depicted in FIG. 10 (under "Cumulative Index Settlement"). (As mentioned above, since the reports are sample reports, amounts may not track from report to report.) If hedging benchmarks other than S & P were involved, they would be treated generally in the manner discussed above, and the amounts totaled in the "Totals" row.

FIG. 14 depicts a sample Tax Report that indicates the tax consequences of the partial withdrawal reported in the Termination Events detail report of FIG. 13. As pointed out above, there is no tax impact to the participant 110 or sponsor 120 until the deferred compensation is received by the participant 110, through a withdrawal.

From the sample Termination Events report of FIG. 13, Participant #2 withdrew $2410.50 of S&P market valuation, which resulted in a payment ("Termination Payment") to the plan sponsor 120 by the balance sheet provider 150 equal to the investment growth of the hedging benchmark (S & P) over the capitalized cost amount, in this case, $58.78. Due to periodic settlements, however, the termination payment is only the last payment made to settle the swap, and payments made previously during index settlements are not reflected in the Termination Event Details report since they have already been settled.

The Tax report depicted in FIG. 14 accounts for the gain/(loss) made over the course of the swap (Cumulative Gain/(Loss) on Swap), which is calculated for the portion being withdrawn. The cumulative gain or loss on a swap is determined by multiplying the Cumulative Swap Income/(Expense) to date by the ratio of the Market Valuation Redeemed (also reported in the Termination Events Detail report of FIG. 13) and the total Market Valuation at time of Withdrawal, (also reported in the Termination Events report of FIG. 13 as Market Valuation Redeemed). In the FIG. 14 sample report, the Swap Income/(Expense) is $958.55, and the ratio of the Market Valuation Redeemed over the total market valuation (Market Valuation at Time of Withdrawal) is $2410.50/$7330.47, which yields a Cumulative Gain/(Loss) On Swap of $315.20.

Cumulative Swap Income/(Expense) represents the amount earned on the NQDC plan swap hedge by the plan sponsor 120 over the life of the NQDC Plan Swap Hedge for the participants participating in the plan. Other calculation methods may incorporate elements that make up the cumulative Swap Income/(Expense) as described in connection with the Swap Summary report of FIG. 9. The ratio used to allocate the portion of Cumulative Swap Income/(Expense) is the percentage of Market Valuation Redeemed of the total amount available. Other ratios may be used to proportion out the Cumulative Swap Income/(Expense), as long as they can be deemed reasonable and consistent for tax purposes.

The sample Tax Report of FIG. 14 also indicates the Cumulative LIBOR Accruals on the swap, which in this sample report is $64.80, and the corresponding Tax Deductible LIBOR Accruals, which are the cumulative LIBOR accruals multiplied by the same ratio used to determine the cumulative gain/(loss) on swap. Again, this ratio may vary but will usually be consistent with the one employed for the cumulative gain/(loss) on swap calculation. In the sample Tax Report depicted in FIG. 14, the Tax Deductible LIBOR Accrual is $21.31.

The cash settlement on company stock options is equal to the current value of the stock options on the company stock less the original principal amount, and is not taxable. The sample Tax Report reflects a withdrawal from one specified index, and not from company stock, so the Cash Settlement on Options/Forwards is $0.00. It is also possible to withdraw from numerous specified indices at one time, if desired by the plan participant 110.

The FIG. 14 sample Tax Report also provides summary information (at the bottom of the report) on Taxable Income related to the distribution, including gains and losses (Gains on Swaps/Forwards and Gains on Options), the Tax Deduction, including the Deferred Compensation Expense and the Proportionate LIBOR Payments, and the Net Tax Deduction Upon Withdrawal, which is the difference between the taxable income and the tax deduction amounts. This section summarizes the tax impact relating to the portion of the hedge corresponding to the withdrawal. The Net Tax Deduction Upon Withdrawal is calculated by the TAX and GAAP methods and reported in the FIG. 14 Tax Report. In addition, a Cumulative tax amount is calculated, which is the difference between the Net Tax Deduction Upon Withdrawal and the Original Deferral. This cumulative amount represents the amount gained/lost on the deferred compensation plan by the plan sponsor 120 on the initial deferral investment for this withdrawal, after NQDC Plan Swap Hedge results are factored in. This cumulative amount is a gauge of the effectiveness of the swap/option/forward as a hedge of the deferred compensation plan from the original deferral date to the withdrawal date of this portion of the deferred compensation. The original deferral amount may be granted by the plan administrator 130 or calculated from the tax basis, as tracked by the plan coordinator 140 and regularly reported in the DC plan details reports (See FIG. 6 for an example). In this case, the original deferral amount is assumed provided by the plan administrator 130.

The information provided in this report consists of taxable and tax deductible amounts related to a tax-triggering event.

FIG. 15

FIG. 15 (comprising FIG. 15A and FIG. 15B) depicts a sample Transaction Log Details report that shows the upcoming transactions for a given period of time, such as the next two weeks. This report is generated using information from the plan administrator 130, and indicates events such as new deferrals (new deferred compensation), withdrawals, and reallocations. The required lead times and timing of new deferrals and withdrawals will generally be set by the plan sponsor 120, while the plan participant 110 may provide instructions for reallocating the compensation among the various investment offerings from time to time via the plan administrator 130. This report (FIG. 15A) indicates the Plan Participant, the Event, the Date the instruction was provided, the Effective Date of the transaction, the Original Deferral Amount and Current Valuation associated with the event, the Specified Index into which an allocation/new deferral is to be allocated, and a Specified Index from which a reallocation or withdrawal is to be withdrawn. For a new deferral, the Original Deferral Amount and Current Valuation Amount are the same since no investment gains (or losses) have been realized. This report may be provided to the plan sponsor 120 during administration of a NQDC plan swap hedge process, as represented by the process flow arrow 8 in FIG. 2, during a transaction results summary.

The sample Transaction Log Details report of FIG. 15 further provides a summary of increases and decreases to the various specified indices based on the upcoming transaction date. Separate Transaction Log Details reports may be provided for specified indices other than the company stock, and for investments in company stock. Separate reports are provided because the deferred compensation that is allocated to company stock is generally handled differently than the compensation allocated to non-company stock investment options. The company stock amount may be hedged using put and call options or forwards rather than a swap.

FIG. 16

FIG. 16 depicts a sample NQDC Plan Swap Hedge Spread Details report that provides summary aggregate level fee information for a single balance sheet provider (Balance Sheet Provider A) by plan Sponsor (Plan Sponsor X and Plan Sponsor Y). Fee information is provided for each plan coordinator and in the NQDC plan for the particular plan sponsor. The following is provided for each Plan Sponsor X and Y: the Capitalized Cost for each of the identified Hedging Benchmarks and Implicit Cash; fee information (Spread and Amount) for Plan Coordinator I and Balance Sheet Provider A, and NQDC Plan Swap Hedge Totals (LIBOR Rate, Spread and Monthly LIBOR Payments). Grand totals are provided at the bottom of the report. This report may be provided to the plan administrator 130 and balance sheet provider 140 (possibly other parties earning hedge-related fees also) during administration of a NQDC plan swap hedge process, as represented by the process flow arrows 3b and 7 in FIG. 2.

In the plan represented by the sample report depicted in FIG. 16, Balance Sheet Provider A provides NQDC plan swap hedges for Plan Sponsors X and Y. For Plan Sponsor X, Balance Sheet Provider A hedges $10,000 (Capitalized Cost) of S&P. For the upcoming reporting period, Plan Coordinator I will earn $2.72 (Amount) as a fee, which is obtained by multiplying the Spread by the Capitalized Cost and by 28/360 (the appropriate ratio for the reporting period, February, 2002, under the actual/360 accrual method). Different accrual methods may be employed. Balance Sheet Provider A earns $16.72 on the S&P hedge for the upcoming reporting period, calculated in the same way as Plan Coordinator I's fee (Amount). The total fee paid by Plan Sponsor X is $19.44 (Monthly LIBOR Payments) ($2.72 plus $16.72). The Spreads of Plan Coordinator I and Balance Sheet Provider A total the LIBOR Rate and Spread under NQDC Plan Swap Hedge Totals. For S&P, Plan Coordinator I's Spread of 0.35% plus Balance Sheet Provider A's Spread of 2.15% is 2.50%, which is equivalent to the LIBOR Rate of 2.00% plus Spread of 0.50% under NQDC Plan Swap Hedge Totals for S&P. The spreads may differ per hedging benchmark.

The report depicted in FIG. 16 is for Balance Sheet Provider A. A similar report may be provided that includes other or all balance sheet providers in a particular plan of a particular plan sponsor. A similar report may be organized by plan sponsor rather than balance sheet provider. The number of parties involved may differ from NQDC plan swap hedge to hedge.

FIG. 17

The sample Implicit Cash Calculations report depicted in FIG. 17 reports implicit cash (see description of FIG. 5 above) for the period March 2002. These calculations are presented in report form, e.g., to assist the relevant parties in reconciling the calculations. Implicit cash calculations may be performed on behalf of the plan administrator 130 or balance sheet provider 150. The Implication Cash Calculations report may be provided to the balance sheet provider 140 in the administration of a NQDC plan swap hedge process, during the swap information reconciliation, as represented by the process flow arrow 7 in FIG. 2.

Referring to the report depicted in FIG. 17, the difference between the Capitalized Cost of the Reallocation (from the S&P Hedging Benchmark), and the Market Valuation of Reallocation equals the Change in Implicit Cash. Calculated implicit cash reflects the change in implicit cash plus any prior implicit cash. The Calculated Implicit Cash is the sum of the Prior Implicit Cash ($0.00 in the sample report) and the Change in Implicit Cash. Calculated Implicit Cash reflects the implicit cash account right before implicit cash is reset to zero as part of an index settlement. Current Implicit Cash reflects the implicit cash account after an index settlement, if one occurs in the report period. Reporting Calculated Implicit Cash provides balance sheet provider with the value of implicit cash that it must settle as part of the index settlement. Calculated Implicit Cash reflects this period's change in implicit cash, which must be settled as part of the index settlement. Current Implicit Cash takes into account resets from index settlements, while Calculated Implicit Cash does not.

In the sample report depicted in FIG. 17, the Calculated Implicit Cash for the report period is −$720.00. The index settlement in this reporting period resets the implicit cash, so Current Implicit Cash is $0.00. As part of the index settlement, the balance sheet provider must settle this −$720.00 Calculated Implicit Cash amount with the plan sponsor. After the index settlement, Calculated Implicit Cash (reported as Implicit Cash in other reports) equals Current Implicit Cash.

The sample Implicit Cash Calculations report of FIG. 17 is an example of a detailed calculations report, which shows the different components of a calculation for reconciliation purposes. Such reports are provided to accommodate balance sheet providers and plan administrators of varying capacities. Detailed calculations reports other than an Implicit Cash Calculations report may be created for any calculations required for the NQDC plan swap hedge, such as but not limited to index settlement, tax basis, or capitalized cost calculations. The need or desirability of such reports depends on the structure of the NQDC plan swap hedge employed. The reports can be provided at various stages in the administration of a NQDC plan swap hedge, depending on the calculations involved.

FIG. 18

The sample Dividends Report depicted in FIG. 18, based on information from the plan administrator, assists in reconciling the dividends from the NQDC plan to the NQDC plan swap hedge. The plan coordinator provides this report to the balance sheet provider to communicate the reported information on behalf of the plan sponsor. A Dividends Report is created periodically or whenever a dividend is declared on a specified index. The sample Dividends Report in FIG. 18 reports dividends for two Specified Indices, S&P and Janus. The number of Units for each index is listed as well as the Dividend Price/Share and the Dividend Amount, which is equal to Units multiplied by Dividend Price/Share. The Dividends report may be provided to the balance sheet provider 140 in the administration of a NQDC plan swap hedge process, during the swap information reconciliation, as represented by process flow arrow 7 in FIG. 2.

The calculations described above are used to determine, among other things, payments to and from the plan coordinator, gains/losses, tracking error between the plan sponsor's obligations under the deferred compensation plan and the plan sponsor's NQDC plan swap hedges, and tax liabilities and net exposure of the plan sponsor.

The plan coordinator may organize its records and store the information disclosed herein using known database techniques. Methodologies, algorithms, formulas and equations are disclosed above for calculating values, data modification and otherwise obtaining, arranging, producing, storing, etc., the information and reports used in the administration of an NQDC plan in accordance with the invention. Also, the information, reports, calculations, etc., disclosed above for the administration of an NQDC plan are exemplary. From the disclosure herein, those of skill in the art can construct computer programs to implement such methodology, algorithms, formulas and equations, and produce reports exemplified by the reports disclosed herein While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for administering, by at least one programmed computer, a plan sponsor's hedging, periodically reset, of at least a portion of the plan sponsor's liability related to at least one notional investment made available by the plan sponsor of at least one nonqualified deferred compensation plan, using at least one notional instrument that comprises at least one total return swap, the method comprising:
   a) periodically receiving, electronically, from at least one source, at least the following data:
      i) the at least portion of the plan sponsor's liability related to an initial notional investment or at least portion of a subsequent notional investment of the at least one plan notional investment of the at least one nonqualified deferred compensation plan of the plan sponsor, wherein the at least one plan notional investment is to be hedged and wherein at least one plan participant in the at least one nonqualified deferred compensation plan is notionally invested in the at least one plan notional investment, or
      ii) at least one current amount hedged in at least one swap reference fund of the at least one total return swap;
   b) calculating, by the at least one programmed computer, at least a portion of a required swap notional principal amount in order to hedge at least a portion of the at least one nonqualified deferred compensation plan liability, based at least in part on:
      i) determining an amount of the plan sponsor's liability related to the at least one plan notional investment to be hedged with at least one swap referenced fund, and
      ii) where necessary, converting at least one plan notional investment into at least one swap referenced fund that is not a plan notional investment;
   c) calculating, by the at least one programmed computer, based at least in part on the at least portion of the required swap notional principal amount, the following:
      i) at least one adjustment showing the at least one swap notional principal amount for the at least one swap reference fund of the at least one total return swap, and
      ii) at least one amount required to be bought or sold in order to modify the at least one total return swap to hedge the liability of the plan sponsor in the at least portion of the at least one nonqualified deferred compensation plan of the plan sponsor; and providing the at least one adjustment to a swap provider.

2. The method of claim 1, wherein further comprising:
reconciling the obtained data on the at least one current amount hedged in the at least one swap reference fund of the at least one total return swap with at least one of:
   (a) market data about the at least one swap reference fund of the at least one total return swap and
   (b) original hedging data used for hedging in the at least one swap reference fund of the at least one total return swap.

3. A method for administering, by at least one programmed computer, a plan sponsor's hedging, periodically reset, of at least a portion of the plan sponsor's liability related to at least one notional investment made available by the plan sponsor of at least one nonqualified deferred compensation plan, using at least one notional instrument that comprises at least one total return swap, the method comprising:
calculating, by the at least one programmed computer, at least one swap reference fund settlement amount by obtaining a current balance on a current payment settlement date of at least one swap notional principal amount by at least:
   (a) adding at least one notional trade and
   (b) subtracting a previous balance on a previous payment settlement date for the at least one swap notional principal amount;
calculating, by the at least one programmed computer, at least one swap index leg settlement amount based at least in part on:
   (a) the previous balance on the previous payment settlement date for the at least one swap notional principal amount and
   (b) at least one swap interest benchmark rate and a number of days between the current and the previous swap settlement dates to calculate the at least one swap index leg settlement amount for at least a portion of the at least one swap notional principal amount; and
comparing and reconciling the swap settlement amounts to amounts calculated by a swap provider.

4. The method of claim 3, wherein the at least one swap interest benchmark rate is London Interbank Offered Rate or the Federal Funds Rate.

5. A method for administering, by at least one programmed computer, a plan sponsor's hedging, periodically reset, of at least a portion of the plan sponsor's liability related to at least one notional investment made available by the plan sponsor of at least one nonqualified deferred compensation plan, using at least one notional instrument that comprises at least one total return swap, the method comprising:
calculating, by the at least one programmed computer, a net exposure for the plan sponsor wherein the net exposure is a difference between:
   i) at least one valuation of at least one swap reference fund for at least a portion of at least one swap notional principal amount of the at least one total return swap and
   ii) at least one valuation for at least one hedged portion of the plan sponsor's liability related to the at least one nonqualified deferred compensation plan; and
reporting the calculated net exposure.

6. A method for administering, by at least one programmed computer, a plan sponsor's hedging, periodically reset, of at least a portion of the plan sponsor's liability related to at least one notional investment made available by the plan sponsor of at least one nonqualified deferred compensation plan, using at least one notional instrument that comprises at least one total return swap, the method comprising:
calculating, by the at least one programmed computer a net profit and loss for the plan sponsor wherein the net profit and loss is a difference between:

i) a profit and loss realized on the at least one total return swap for at least a portion of a swap notional principal amount and ii) a profit and loss realized on at least one hedged portion of the plan sponsor's liability related to the at least one nonqualified deferred compensation plan, and reporting the calculated net profit and loss.

7. The method of claim 6, wherein further comprising:

calculating, by the at least one programmed computer, at least one attribution for the difference between:

i) the profit and loss realized on the at least one total return swap for the at least portion of the swap notional principal amount and ii) the profit and loss realized on the at least one hedged portion of the plan sponsor's liability related to the at least one nonqualified deferred compensation plan, wherein the at least one attribution is based on at least one of:

a) at least one difference in timing between at least one change in at least one investment allocation between the notional investments of the plan sponsor's nonqualified deferred compensation plan and at least one change in allocation between at least one swap reference fund of the at least one total return swap, and b) at least one difference between returns for the notional investments of the plan sponsor's nonqualified deferred compensation plan and returns for the at least one swap reference fund of the at least one total return swap.

8. A method for administering, by at least one programmed computer, a plan sponsor's hedging, periodically reset, of at least a portion of the plan sponsor's liability related to at least one notional investment made available by the plan sponsor of at least one nonqualified deferred compensation plan, using at least one notional instrument that comprises at least one total return swap, the method comprising:

a) periodically receiving, electronically, from at least one source, at least the following data:

1) at least one notional investment amount for at least one plan participant in the at least one nonqualified deferred compensation plan offered by the plan sponsor, comprising at least one of:

i) at least one allocation or reallocation into at least one plan notional investment for the at least one plan participant, ii) at least one additional deferral for the at least one plan participant to the plan sponsor's at least one nonqualified deferred compensation plan, iii) at least one distribution for the at least one plan participant from the plan sponsor's at least one nonqualified deferred compensation plan, and 2) at least one amount paid to and received from the plan sponsor and a swap provider, based at least in part on the at least one total return swap, wherein the at least one amount comprising at least one of:

i) at least one swap index leg settlement or accrued amount, ii) at least one swap reference fund settlement or accrued amount, and iii) at least one change in at least one swap reference fund allocation for the at least one total return swap;

b) calculating, by the at least one programmed computer, at least one swap settlement or accrued amounts for the at least one plan participant and at least one return or loss attributable to at least swap reference fund, subaggregated to each plan participant in the at least one nonqualified deferred compensation plan;

c) storing and accumulating, by the at least one programmed computer, the subaggregated total swap settlement or accrued amounts attributable to each plan participant in the at least one nonqualified deferred compensation plan offered by the plan sponsor; and d) reporting, by the at least one programmed computer, the accumulated swap settlement or accrued amounts for each plan participant in the plan sponsor's at least one nonqualified deferred compensation plan.

9. The method of claim 8, wherein further comprising:

reducing, by the at least one programmed computer, the accumulated total swap settlement or accrued amounts for each plan participant, by an amount that is equal to a current accrued amount for a particular plan participant divided by a mathematically allocable share of any distributions paid to the particular plan participant under the plan sponsor's at least one nonqualified deferred compensation plan during a specified period.

\* \* \* \* \*

UNITED STATES PATENT AND TRADEMARK OFFICE
CERTIFICATE OF CORRECTION

| | | |
|---|---|---|
| PATENT NO. | : 8,290,849 B2 | Page 1 of 1 |
| APPLICATION NO. | : 10/752213 | |
| DATED | : October 16, 2012 | |
| INVENTOR(S) | : Eisler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this
Twenty-second Day of July, 2014

Michelle K. Lee
*Deputy Director of the United States Patent and Trademark Office*